(12) United States Patent
Mastropaolo

(10) Patent No.: US 10,338,847 B1
(45) Date of Patent: Jul. 2, 2019

(54) COHERENT BUFFER MAPPING FOR VIRTUALIZED GRAPHICS PROCESSING

(71) Applicant: Amazon Technologies, Inc., Seattle, WA (US)

(72) Inventor: Marco Mastropaolo, Turin (IT)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/688,685

(22) Filed: Aug. 28, 2017

(51) Int. Cl.
*G06F 3/06* (2006.01)
*G06F 9/455* (2018.01)
*G06T 1/60* (2006.01)

(52) U.S. Cl.
CPC ............ *G06F 3/0656* (2013.01); *G06F 9/455* (2013.01); *G06T 1/60* (2013.01); *G06F 2009/45587* (2013.01)

(58) Field of Classification Search
CPC ......... G06T 15/005; G06T 1/20; G06T 15/04; G06T 1/60; G09G 5/363; G09G 5/393; G06F 3/14
See application file for complete search history.

(56) References Cited

U.S. PATENT DOCUMENTS

| | | | |
|---|---|---|---|
| 9,069,622 | B2 | 6/2015 | Post et al. |
| 9,098,323 | B2 | 8/2015 | Mitra et al. |
| 2011/0083131 | A1 | 4/2011 | Pirzada et al. |
| 2012/0069032 | A1 | 3/2012 | Hansson et al. |
| 2012/0154389 | A1 | 6/2012 | Bohan et al. |
| 2014/0055466 | A1 | 2/2014 | Petrov et al. |
| 2014/0169471 | A1 | 6/2014 | He |
| 2014/0176583 | A1 | 6/2014 | Abiezzi et al. |
| 2014/0181806 | A1 | 6/2014 | Abiezzi |
| 2014/0215462 | A1 | 7/2014 | Kuo et al. |
| 2014/0286390 | A1 | 9/2014 | Fear |
| 2015/0067672 | A1 | 3/2015 | Mitra et al. |

(Continued)

FOREIGN PATENT DOCUMENTS

WO 2014100558 6/2014

OTHER PUBLICATIONS

Federico Silla. "The rCUDA technology: an inexpensive way to improve the performance of GPU-based clusters." Talk at Computer Engineering Laboratory, Delft University of Technology. Delft, Netherlands. Apr. 2015.

(Continued)

*Primary Examiner* — Todd Buttram
(74) *Attorney, Agent, or Firm* — Robert C. Kowert; Meyertons, Hood, Kilvin, Kowert & Goetzel, P.C.

(57) ABSTRACT

Methods, systems, and computer-readable media for coherent buffer mapping for virtualized graphics processing are disclosed. A virtual graphics processing unit (GPU) is implemented using a physical GPU in a GPU server and attached to a computing device over a network. Based on a memory mapping call issued by an application on the computing device, a local buffer is allocated. The local buffer represents a view of a memory buffer of the physical GPU and is protected from access by the application. Based on a request by the application to access the local buffer while the local buffer is protected, metadata is generated indicating that the local buffer needs transfer. Based on the metadata, contents of the local buffer are transferred from the computing device to the physical GPU or contents of the memory buffer are transferred from the physical GPU to the computing device.

20 Claims, 15 Drawing Sheets

(56) References Cited

U.S. PATENT DOCUMENTS

2015/0097844 A1 4/2015 Wankhede et al.
2015/0116335 A1 4/2015 Chen et al.
2015/0220354 A1 8/2015 Nair
2015/0370589 A1 12/2015 Bidarkar et al.
2016/0239333 A1 8/2016 Cowperthwaite et al.
2016/0247248 A1 8/2016 Ha et al.

OTHER PUBLICATIONS

Antonio J. Peña, et al, "A complete and efficient CUDA-sharing solution for HPC clusters." In Parallel Computing Journal, vol. 40, Issue 10, pp. 574-588. Dec. 2014, http://www.sciencedirect.com/science/article/pii/S0167819114001227.
"NICE DCV Administration Guide," version 2014.0, NICE s.r.l., Asti, Italy, Jul. 2015. Source: https://www.nice-software.com/download/nice-dcv-2014#documentation. pp. 1-96.
Jeff Weiss, et al., "NVIDIA Grid VCPU Deployment Guide for Vmware Horizon 6.1", NVIDIA TechPub, Mar. 1, 2015, Retrieved from URL: http://www.vmware.com/content/dam/digitalmarketing/vmware/en/pdf/products/horizon/grid-vgpu-deployement-guide.pdf, pp. 1-14.
Martijin Smit, Installing VMwae VGPU on vSphere 6.0, Mar. 7, 2015, pp. 1-10.
Lin Shi, et al., "vCUDA: GPU-Accelerated High-Performance Computing in Virtual Machines", IEEE Transaction on Computers, vol. 61, No. 6, Jun. 2012, pp. 804-816.
Matthew Danish, et al., "Virtual-CPU Scheduling in the Quest Operating System", 2011 17th IEEE Real-Time and Embedded Technology and Application Symposium, Apr. 11, 2011, pp. 169-179.
Mark Panahi, et al., "A Framework for Real-Time Service-Oriented Architecture", 2009 IEEE Conference on Commerce and Enterprise Computing (CED '09), Jul. 20, 2009, pp. 460-467.
Marcos D. Assuncao, et al., "CloudAffinity: A Framework for Matching Servers to Cloudmates", 2012 IEEE Network Operations and Management Symposium (NOMS 2012), Apr. 16-20, 2012, pp. 213-220.
Shinpei Kato, et al., "Gdev: First-Class GPU Resource Management in the Operating System", Jun. 1, 2012, Retrieved from URL: https://www.usenix.org/system/files/conference/atc12/atc12-final1319.pdf, pp. 1-12.
U.S. Appl. No. 14/822,511, filed Aug. 10, 2015, Nicholas Patrick Wilt, et al.

COHERENT BUFFER MAPPING FOR VIRTUALIZED GRAPHICS PROCESSING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

Figure 1:
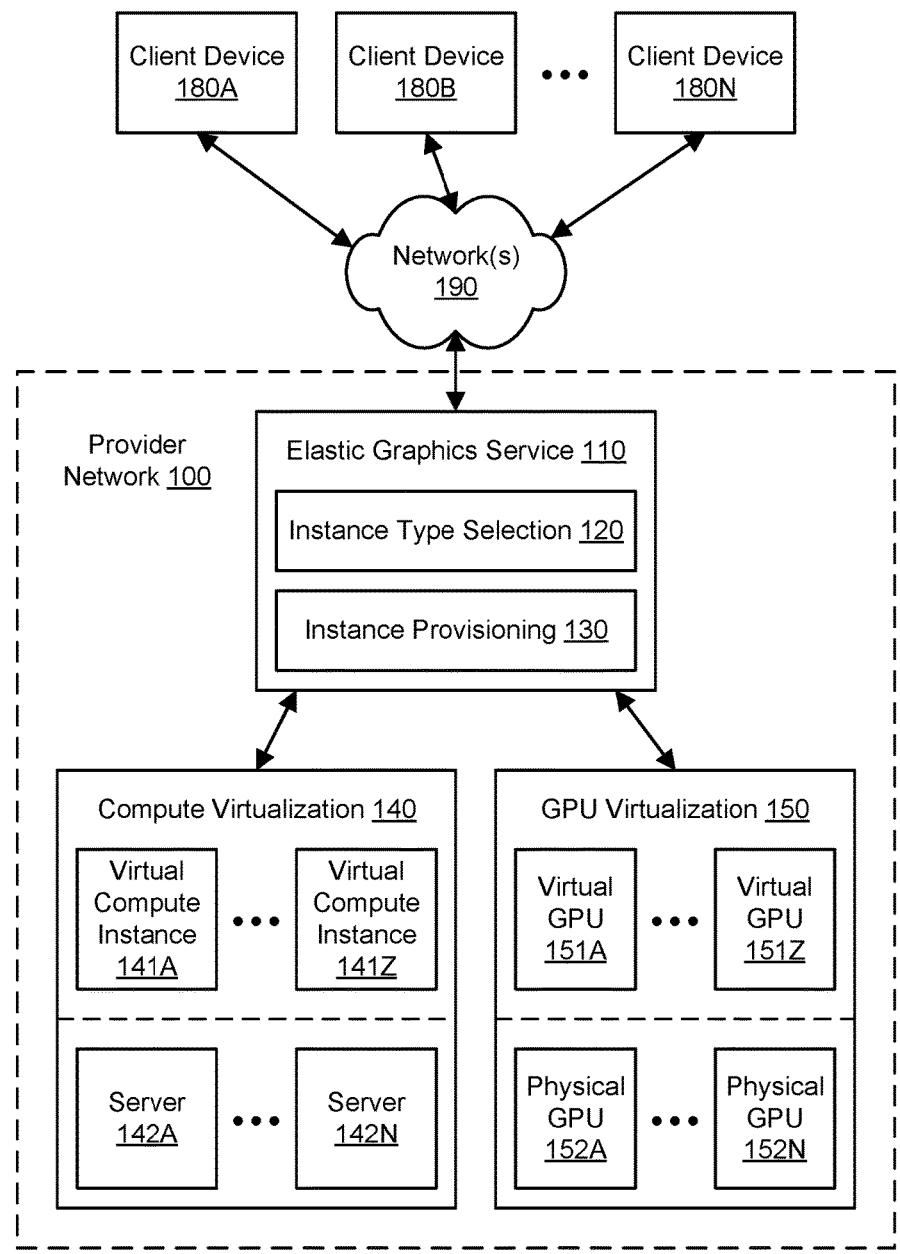
FIG. 1 illustrates an example system environment for virtualizing graphics processing in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for coherent buffer mapping for virtualized graphics processing are described. Using the techniques described herein, a computing device may be provisioned, and a virtual graphics processing unit (GPU) may be attached to the computing device to provide virtualized graphics processing over a network connection. The virtual GPU may be implemented in a GPU server in a multi-tenant provider network. The computing device, also referred to as an application host, may be configured to execute an application using the virtualized graphics processing provided by the virtual GPU. One or more graphics libraries may be installed on the computing device. These graphics libraries, such as versions of OpenGL or Vulkan, may include sets of graphics functions that are offered to applications. The application may issue a memory mapping call to a graphics library to request creation of a coherently mapped buffer. Unlike local buses like PCI Express or AGP, the network interconnect may not include hardware support for coherent memory mapping. To implement coherent buffer mapping over the network, a local buffer on the application host may be allocated and initially protected against write access or read access. The local buffer may represent a view of a memory buffer on the GPU server. An exception handler may be attached, and the exception handler may intercept an exception that is raised if the application attempts to access the local buffer while it is protected against writes or reads. In the case of a write request, the exception handler may mark the local buffer as "dirty" (or needing transfer) and allow the write; if marked as such, the contents of the local buffer may be transferred to the physical GPU via the network when a draw call is received. In the case of a read request, the exception handler may lock the application (e.g., using a spinlock), mark the local buffer as needing transfer, and awaken a thread to transfer the contents of the memory buffer to the computing device via the network. Using these techniques, a memory buffer of a virtual GPU may be coherently mapped to a local buffer on an application host while optimizing network usage.

Virtualized Graphics Processing in a Provider Network

FIG. 1 illustrates an example system environment for virtualizing graphics processing in a provider network, according to one embodiment. Clients of a provider network 100 may use computing devices such as client devices 180A-180N to access an elastic graphics service 110 and other resources offered by the provider network. The client devices 180A-180N may be coupled to the provider network 100 via one or more networks 190. The provider network 100 may provide compute virtualization 140 such that a plurality of virtual compute instances 141A-141Z may be implemented using a plurality of servers 142A-142N, also referred to as physical compute instances. The virtual compute instances 141A-141Z may also be referred to herein as virtual machines (VMs). Similarly, the provider network 100 may provide GPU virtualization 150 such that a plurality of virtual GPUs 151A-151Z may be implemented using a plurality of physical GPUs 152A-152N. An example hardware architecture for implementing virtual GPUs using physical GPUs is discussed with reference to FIG. 5. The underlying servers 142A-142N may be heterogeneous, and the underlying physical GPUs 152A-152N may be heterogeneous as well. In one embodiment, the compute virtualization 140 may use techniques for multi-tenancy to provision virtual compute instances 141A-141Z that exceed the servers 142A-142N in number. In one embodiment, the GPU virtualization 150 may use techniques for multi-tenancy to provision virtual GPUs 151A-151Z that exceed the physical GPUs 152A-152N in number.

The elastic graphics service 110 may offer, to clients, selection and provisioning of virtualized compute instances with attached virtualized GPUs. Accordingly, the elastic graphics service 110 may include an instance type selection functionality 120 and an instance provisioning functionality 130. In one embodiment, the provider network 100 may offer virtual compute instances 141A-141Z with varying computational and/or memory resources. In one embodiment, each of the virtual compute instances 141A-141Z may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, an instance type may be selected for a client, e.g., based (at least in part) on input from the client. For example, a client may choose an instance type from a predefined set of instance types. As another example, a client may specify the desired resources of an instance type, and the instance type selection functionality 120 may select an instance type based on such a specification.

In one embodiment, the provider network 100 may offer virtual GPUs 151A-151Z with varying graphics processing capabilities. In one embodiment, each of the virtual GPUs 151A-151Z may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, a virtual GPU class may be selected for a client, e.g., based (at least in part) on input from the client. For example, a client may choose a virtual GPU class from a predefined set of virtual GPU classes. As another example, a client may specify the desired resources of a virtual GPU class, and the instance type selection functionality 120 may select a virtual GPU class based on such a specification.

Therefore, using the instance type selection functionality 120, clients (e.g., using client devices 180A-180N) may specify requirements for virtual compute instances and virtual GPUs. The instance provisioning functionality 130 may provision virtual compute instances with attached virtual GPUs based on the specified requirements (including any specified instance types and virtual GPU classes). As used herein, provisioning a virtual compute instance generally includes reserving resources (e.g., computational and memory resources) of an underlying server for the client (e.g., from a pool of available physical compute instances and other resources), installing or launching required software (e.g., an operating system), and making the virtual compute instance available to the client for performing tasks specified by the client. For a particular client, a virtual compute instance may be provisioned of the instance type selected by or for the client, and the virtual compute instance may be provisioned with an attached virtual GPU of the GPU class selected by or for the client. In one embodiment, a virtual GPU of substantially any virtual GPU class may be attached to a virtual compute instance of substantially any instance type.

The provider network 100 may be set up by an entity such as a company or a public sector organization to provide one or more services (such as various types of cloud-based computing or storage) accessible via the Internet and/or other networks to client devices 180A-180N. Provider network 100 may include numerous data centers hosting various resource pools, such as collections of physical and/or virtualized computer servers, storage devices, networking equipment and the like (e.g., implemented using computing system 3000 described below with regard to FIG. 11), needed to implement and distribute the infrastructure and services offered by the provider network 100. In some embodiments, provider network 100 may provide computing resources, such as compute virtualization service 140 and GPU virtualization service 150; storage services, such as a block-based storage service, key-value based data stores, or various types of database systems; and/or any other type of network-based services. Client devices 180A-180N may access these various services offered by provider network 100 via network(s) 190. Likewise, network-based services may themselves communicate and/or make use of one another to provide different services. For example, computing resources offered to client devices 180A-180N in units called "instances," such as virtual or physical compute instances or storage instances, may make use of particular data volumes, providing virtual block storage for the compute instances. The provider network 100 may implement or provide a multi-tenant environment such that multiple clients (e.g., using client devices 180A-180N) may access or use a particular resource in a substantially simultaneous manner. The provider network 100 may thus represent a multi-tenant provider network.

As noted above, compute virtualization service 140 may offer various virtual compute instances 141A-141Z to client devices 180A-180N. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the compute virtualization service 140 in different embodiments, including general purpose or special purpose computer servers, storage devices, network devices and the like. In some embodiments, client devices 180A-180N or other any other user may be configured (and/or authorized) to direct network traffic to a virtual compute instance. In various embodiments, virtual compute instances 141A-141Z may attach or map to one or more data volumes provided by a storage service in order to obtain persistent storage for performing various operations. Using the techniques described herein, virtual GPUs 151A-151Z may be attached to virtual compute instances 141A-141Z to provide graphics processing for the virtual compute instances.

Virtual compute instances 141A-141Z may operate or implement a variety of different platforms, such as application server instances, Java™ virtual machines (JVMs) or other virtual machines, general purpose or special-purpose operating systems, platforms that support various interpreted or compiled programming languages such as Ruby, Perl, Python, C, C++ and the like, or high-performance computing platforms) suitable for performing client applications, without for example requiring the client devices 180A-180N to access an instance. In some embodiments, virtual compute instances 141A-141Z may have different instance types or configurations based on expected uptime ratios. The uptime ratio of a particular virtual compute instance may be defined as the ratio of the amount of time the instance is activated to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and the client may pay a discounted hourly usage fee in accordance with the associated pricing policy. If the client expects to have a steady-state workload that requires an instance to be up most of the time, then the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). In some embodiments, particular instance types for virtual compute instances may be associated with default classes for virtual GPUs. For example, some instance types may be configured without a virtual GPU as a default configuration, while other instance types designated for graphics intensive workloads may be designated with particular virtual GPU classes as a default configuration. Configurations of virtual compute instances may also include their location in a particular data center or availability zone, geographic location, and (in the case of reserved compute instances) reservation term length.

The client devices 180A-180N may represent or correspond to various clients or users of the provider network 100, such as customers who seek to use services offered by the provider network. The clients, users, or customers may represent persons, businesses, other organizations, and/or other entities. The client devices 180A-180N may be distributed over any suitable locations or regions. Each of the client devices 180A-180N may be implemented using one or more computing devices, any of which may be implemented by the example computing device 3000 illustrated in FIG. 11.

The client devices 180A-180N may encompass any type of client configurable to submit requests to provider network 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 180A-180N may be configured to generate network-based service requests according to a Representational State Transfer (REST)-style network-based services architecture, a document- or message-based network-based services architecture, or another suitable network-based services architecture. In some embodiments, client devices 180A-180N (e.g., a computational client) may be configured to provide access to a virtual compute instance in a manner that is transparent to applications implement on the client device utilizing computational resources provided by the virtual compute instance. In at least some embodiments, client devices 180A-180N may provision, mount, and configure storage volumes implemented at storage services for file systems implemented at the client devices.

Client devices 180A-180N may convey network-based service requests to provider network 100 via external network(s) 190. In various embodiments, external network(s)

190 may encompass any suitable combination of networking hardware and protocols necessary to establish network-based communications between client devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 100. It is noted that in some embodiments, client devices 180A-180N may communicate with provider network 100 using a private network rather than the public Internet.

Figure 11:
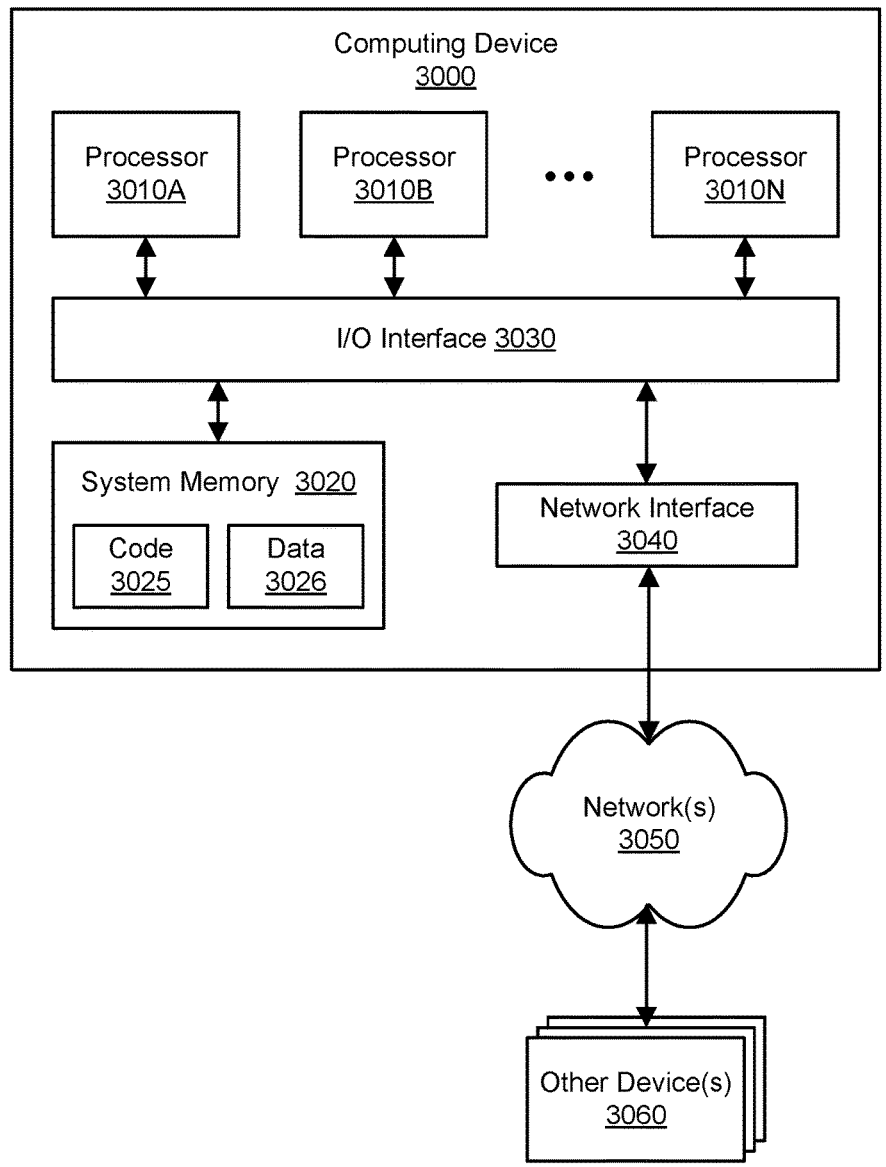
FIG. 11 illustrates an example computing device that may be used in some embodiments.

The provider network 100 may include a plurality of computing devices, any of which may be implemented by the example computing device 3000 illustrated in FIG. 11. In various embodiments, portions of the described functionality of the provider network 100 may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the elastic graphics service 110 and its constituent functionalities 120 and 130) may represent any combination of software and hardware usable to perform their respective functions.

It is contemplated that the provider network 100 may include additional components not shown, fewer components than shown, or different combinations, configurations, or quantities of the components shown. For example, although servers 142A through 142N are shown for purposes of example and illustration, it is contemplated that different quantities and configurations of servers may be used. Similarly, although physical GPUs 152A through 152N are shown for purposes of example and illustration, it is contemplated that different quantities and configurations of physical GPUs may be used. Additionally, although three client devices 180A, 180B, and 180N are shown for purposes of example and illustration, it is contemplated that different quantities and configurations of client devices may be used. Aspects of the functionality described herein for providing virtualized graphics processing may be performed, at least in part, by components outside of the provider network 100.

Figure 2A:
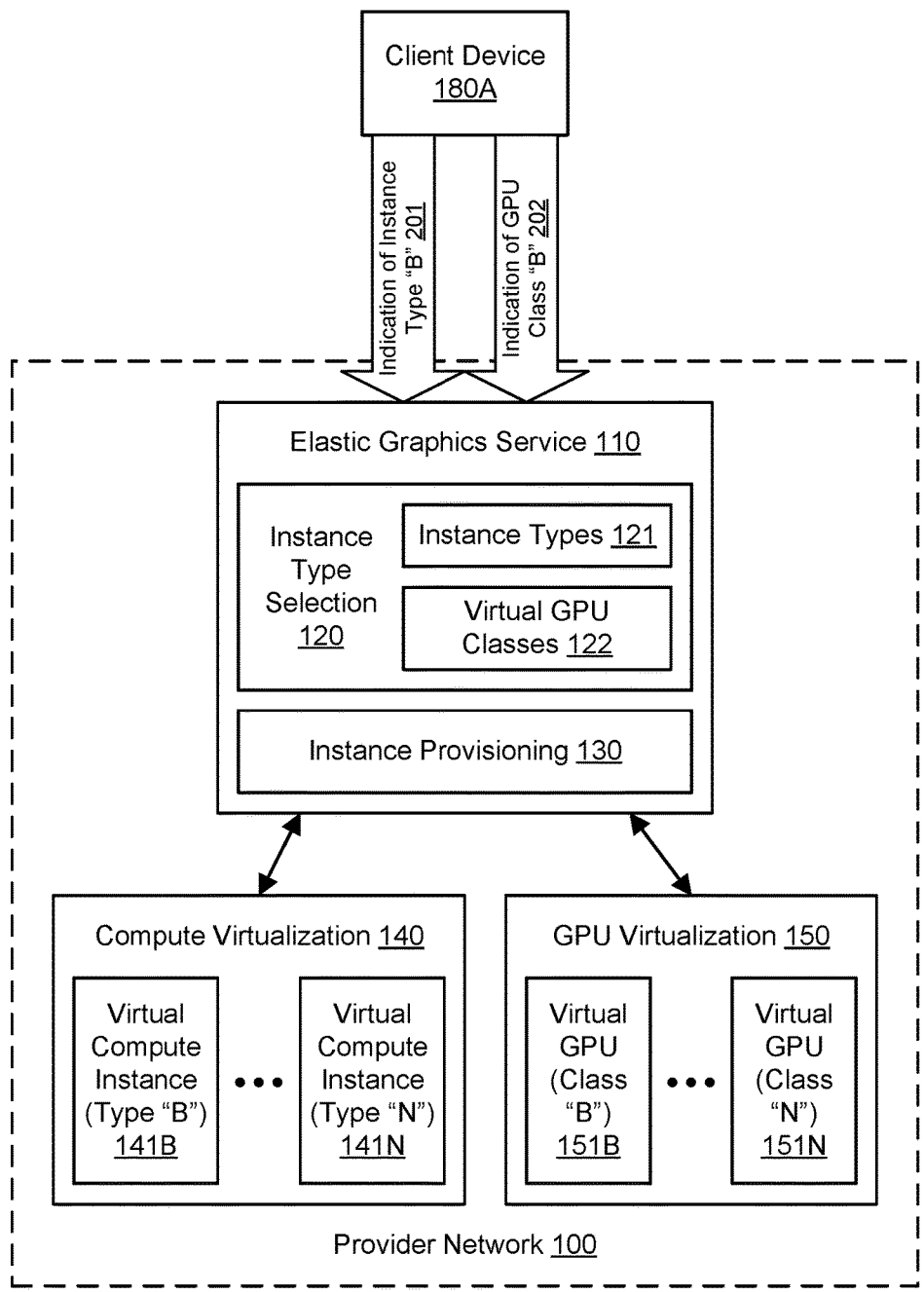
FIG. 2A illustrates further aspects of the example system environment for virtualizing graphics processing in a provider network, including selection of an instance type and virtual GPU class for a virtual compute instance with an attached virtual GPU, according to one embodiment.

FIG. 2A illustrates further aspects of the example system environment for virtualizing graphics processing in a provider network, including selection of an instance type and virtual GPU class for a virtual compute instance with an attached virtual GPU, according to one embodiment. As discussed above, the provider network 100 may offer to the client device 180A a plurality of instance types 121 for virtual compute instances. As shown for purposes of illustration and example, virtual compute instances of type "B" 141B through type "N" 141N may be offered. However, it is contemplated that any suitable number and configuration of virtual compute instance types may be offered to clients by the provider network 100. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 201 of a particular instance type. For example, a client may choose or the instance type "B" from a predefined set of instance types using input 201. As another example, a client may specify the desired resources of an instance type using input 201, and the instance type selection functionality 120 may select the instance type "B" based on such a specification. Accordingly, the virtual compute instance type may be selected by the client or on behalf of the client, e.g., using the instance type selection functionality 120.

As discussed above, the provider network 100 may offer to the client device 180A a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, the client device 180A may provide an indication, specification, or other selection 202 of a particular virtual GPU class. For example, a client may choose the virtual GPU class "B" from a predefined set of virtual GPU classes using input 202. As another example, a client may specify the desired resources of a virtual GPU class using input 202, and the instance type selection functionality 120 may select the virtual GPU class "B" based on such a specification. Accordingly, the virtual GPU class may be selected by the client or on behalf of the client, e.g., using the instance type selection functionality 120.

Figure 2B:
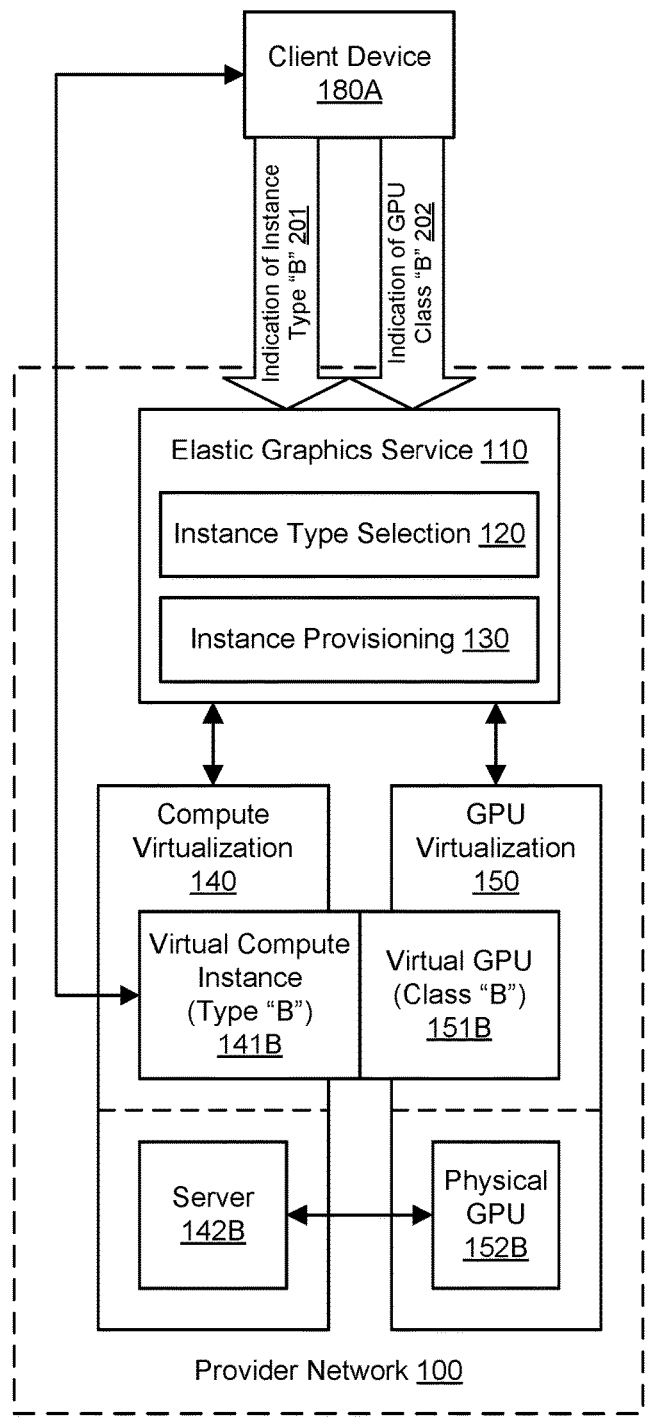
FIG. 2B illustrates further aspects of the example system environment for virtualizing graphics processing in a provider network, including provisioning of a virtual compute instance with an attached virtual GPU, according to one embodiment.

FIG. 2B illustrates further aspects of the example system environment for virtualizing graphics processing in a provider network, including provisioning of a virtual compute instance with an attached virtual GPU, according to one embodiment. The instance provisioning functionality 130 may provision a virtual compute instance 141B with an attached virtual GPU 151B based on the specified instance type "B" and the specified virtual GPU class "B". The provisioned virtual compute instance 141B may be implemented by the compute virtualization functionality 140 using suitable physical resources such as a server 142B, and the provisioned virtual GPU 151B may be implemented by the GPU virtualization functionality 150 using suitable physical resources such as a physical GPU 152B. As used herein, provisioning a virtual compute instance generally includes reserving resources (e.g., computational and memory resources) of an underlying server for the client (e.g., from a pool of available physical compute instances and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141B with the attached virtual GPU 151B, a server 142B may communicate with a physical GPU 152B, e.g., over a network. The physical GPU 152B may be located in a different computing device than the server 142B. Even though they may be implemented using separate hardware, the virtual GPU 151B may be said to be attached to the virtual compute instance 141B, or the virtual compute instance may be said to include the virtual GPU. The virtual GPU 151B may be installed on a device that may reside in various locations relative to the physical GPU 152B, e.g., on the same rack, the same switch, the same room, and/or other suitable locations on the same network. A vendor of the physical GPU 152B may be hidden from the client device 180A.

Figure 3:
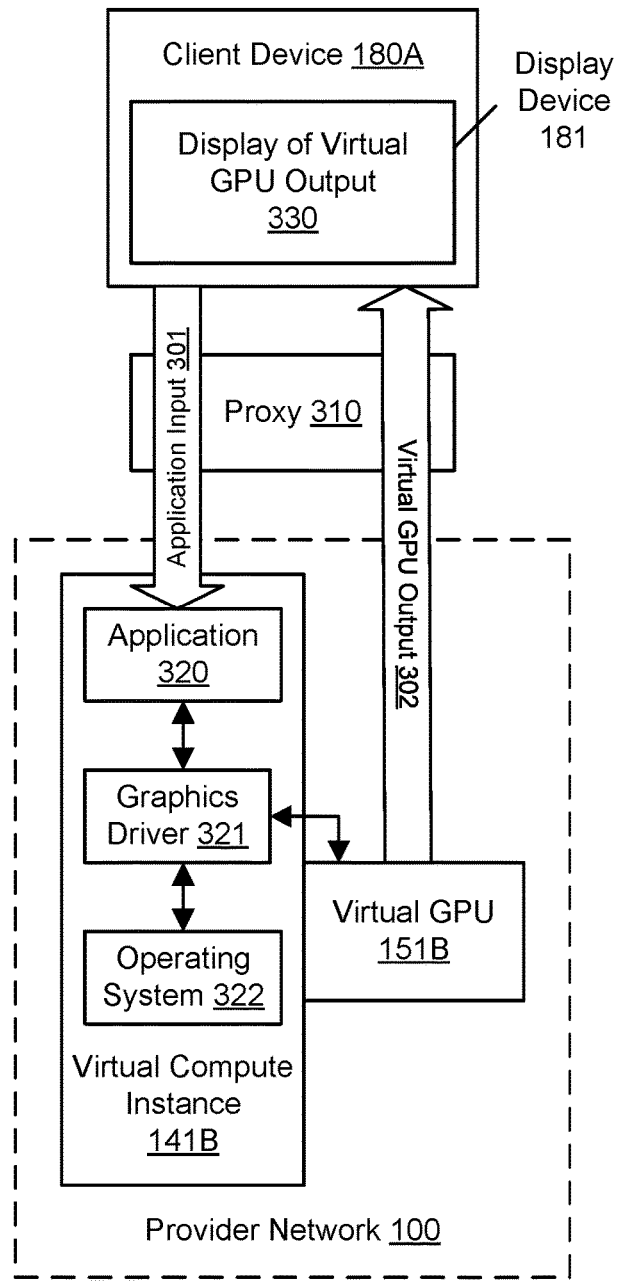
FIG. 3 illustrates the use of a virtual compute instance with a virtual GPU to generate virtual GPU output for display on a client device, according to one embodiment.

FIG. 3 illustrates the use of a virtual compute instance with a virtual GPU to generate virtual GPU output for display on a client device, according to one embodiment. After the virtual compute instance 141B is provisioned with the attached virtual GPU 151B, the client device 180A may use the provisioned instance and virtual GPU to perform any suitable tasks, e.g., based on input from the client device. The virtual compute instance 141B may execute a particular application 320. The application 320 may be selected or provided by the client. The virtual compute instance 141B may also be configured with a particular operating system 322 that provides support for the application 321. Additionally, the virtual compute instance 141B may be configured with a particular graphics driver 321. The graphics driver 321 may interact with the virtual GPU 151B to provide graphics processing for the application 320, including accelerated two-dimensional graphics processing and/or accelerated three-dimensional graphics processing. In one embodiment, the graphics driver 321 may implement a graphics application programming interface (API) such as Direct3D or OpenGL. The graphics driver 321 may represent components running in user mode and/or kernel mode. Additional components (not shown), such as a graphics runtime, may also be used to provide accelerated graphics processing on the virtual compute instance 141B.

The client device 180A may communicate with the virtual compute instance 141B through a proxy 310. Various other communications may be sent through the proxy 310, including for example virtual GPU output 302 from the virtual GPU 151B to the client device 180A. Use of the proxy 310 may hide the address of the virtual compute instance and any associated resources (including a computing device that implements the virtual GPU 151B) from the client device 180A. The proxy 310 and virtual compute instance 141B may communicate using a suitable remoting protocol. In various embodiments, the proxy 310 may or may not be part of the provider network 100. The client device 180A may provide application input 301 to the application 320 running on the virtual compute instance 141B. For example, the application input 301 may include data to be operated upon by the application 320 and/or instructions to control the execution of the application.

Using the graphics processing provided by the virtual GPU 151B, execution of the application may generate virtual GPU output 302. The virtual GPU output 302 may be provided to the client device 180A, e.g., from the virtual GPU 151B or virtual compute instance 141B. In one embodiment, the virtual GPU output 302 may be sent from the virtual GPU 151B (e.g., from a computing device that includes the virtual GPU) to the client device 180A while bypassing the rest of the virtual compute instance 141B (e.g., the underlying server 142B). The virtual GPU output 302 may also be sent to the client device 180A through the proxy 310. The proxy 310 and virtual GPU 151B may communicate using a suitable remoting protocol. In one embodiment, the virtual GPU output 302 may be returned to the virtual compute instance 141B, and the virtual compute instance may send the virtual GPU output to the client device 180A. In one embodiment, the client device 180A may forward the virtual GPU output 302 to another component.

In one embodiment, a display device 181 associated with the client device 180A may present a display 330 of the virtual GPU output 302. In one embodiment, the virtual GPU output 302 may include pixel data, image data, video data, or other graphical data. In one embodiment, the virtual GPU output 302 may drive a full-screen display on the display device 181. Portions of the virtual GPU output 302 may be streamed to the client device 180A over time. In one embodiment, the virtual GPU output 302 may be composited with one or more other sources of graphical data to produce the display 330.

In one embodiment, the virtual GPU 151B may be used for general-purpose GPU computing (e.g., GPGPU computing), and the virtual GPU output 302 may not include pixel data or other graphical data. In various embodiments, the client device 180A may process or transform all or part of the virtual GPU output 302 before displaying the output. For example, a CPU, GPU, or co-processor on the client device 180A may transform portions of the virtual GPU output 302 and display the results on the display device 181.

In various embodiments, any suitable technique(s) may be used to offload graphics processing from a virtual compute instance to a physical GPU. In one embodiment, an API shim may intercept calls to a graphics API and marshal the calls over a network to an external computing device that includes a physical GPU. In one embodiment, a driver shim may surface a proprietary driver to the virtual compute instance, intercept calls, and marshal the calls over a network to an external computing device that includes a physical GPU. In one embodiment, a hardware shim may surface a hardware interface to the virtual compute instance and marshal attempts by the instance to interact with the physical GPU.

Figure 4:
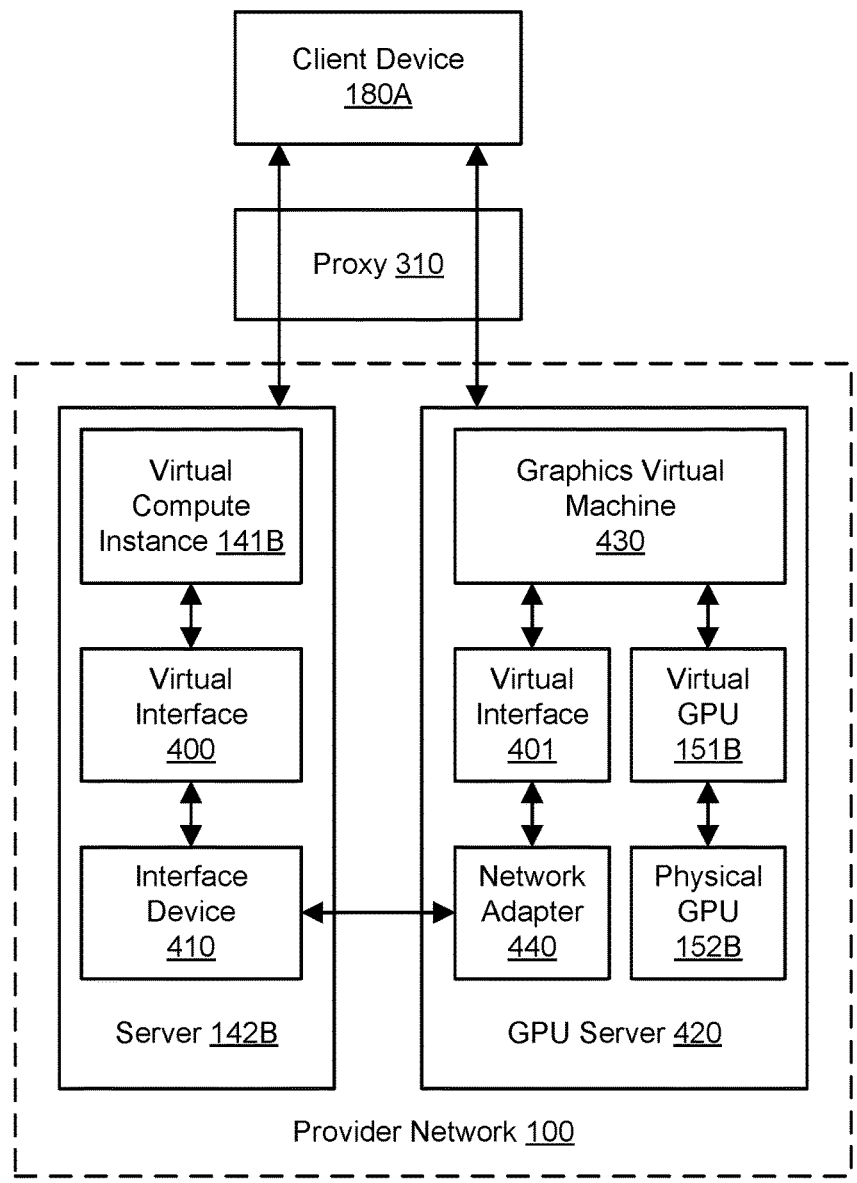
FIG. 4 illustrates an example hardware architecture for implementing virtualized graphics processing, according to one embodiment.

FIG. 4 illustrates an example hardware architecture for implementing virtualized graphics processing, according to one embodiment. In one embodiment, the virtual compute instance 141B may be implemented using a server 142B, and the virtual GPU 151B attached to that instance 141B may be implemented using a separate and distinct computing device termed a GPU server 420, also referred to as a graphics server or graphics appliance. The virtual compute instance 141B may use a virtual interface 400 to interact with an interface device 410. The virtual interface 400 may enable the virtual compute instance 141B to send and receive network data. The interface device 410 may include a network interface and a custom hardware interface. Via the custom hardware interface, the interface device 410 may run program code to emulate a GPU interface and appear to the virtual compute instance 141B to implement or include the virtual GPU 151B. In one embodiment, the interface device 410 may present a graphics API to the virtual compute instance 141B and receive API calls for graphics processing (e.g., accelerated 3D graphics processing). Via the network interface, the interface device 410 may communicate with the GPU server 420 (and thus with the physical GPU 152B) over a network. The interface device 410 may be implemented in any suitable manner, e.g., as an expansion card (such as a PCI Express card) or attached peripheral device for the server 142B. The interface device 410 may use single root I/O virtualization to expose hardware virtual functions to the virtual compute instance 141B. In one embodiment, the server 142B may implement a plurality of virtual compute instances, each with its own virtual interface, and the virtual compute instances may use the interface device 410 to interact with the corresponding virtual GPUs on one or more GPU servers. The server 142B may communicate with the proxy 310 using a suitable remoting protocol, e.g., to send data to and receive data from the client device 180A.

Graphics offload performed by the interface device 410 (e.g., by executing custom program code on the interface device) may translate graphics API commands into network traffic (encapsulating the graphics API commands) that is transmitted to the GPU server 420, and the GPU server 420 may execute the commands on behalf of the interface device. The GPU server 420 may include a network adapter 440 that communicates with the interface device 410 (e.g., with the network interface of the interface device) over a network. In one embodiment, the interface device 410 may receive calls to a graphics API (using the custom hardware interface) and generate graphics offload traffic to be sent to the network adapter 440 (using the network interface). The GPU server 420 may implement a graphics virtual machine 430. Any suitable technologies for virtualization may be used to implement the graphics virtual machine 430. In one embodiment, the graphics virtual machine 430 may represent a generic virtual machine that is GPU-capable and is dedicated to providing accelerated graphics processing using one or more virtual GPUs. The graphics virtual machine 430 may be coupled to the network adapter 440 using a virtual interface 401. The virtual interface 401 may enable the graphics virtual machine 430 to send and receive network data. The graphics virtual machine 430 may implement the virtual GPU 151B using the graphics processing capabilities of the physical GPU 152B. In one embodiment, the physical GPU 152B can be accessed directly by the graphics virtual machine 430, and the physical GPU 152B can use direct memory access to write to and read from memory managed by the graphics virtual machine. In one embodiment, the GPU server 420 may implement a plurality of virtual GPUs (such as virtual GPU 151B) using one or more physical GPUs (such as physical GPU 152B), and the virtual GPUs may interact with the corresponding virtual compute instances on one or more servers over a network. The GPU server 420 may communicate with the proxy 310 using a suitable remoting protocol, e.g., to send data to and receive data from the client device 180A. For example, the GPU server 420 may generate virtual GPU output based on the commands sent from the interface device 410. The virtual GPU output may be provided to the client device 180A through the proxy 310, e.g., from the server 142B or GPU server 420.

Figure 5:
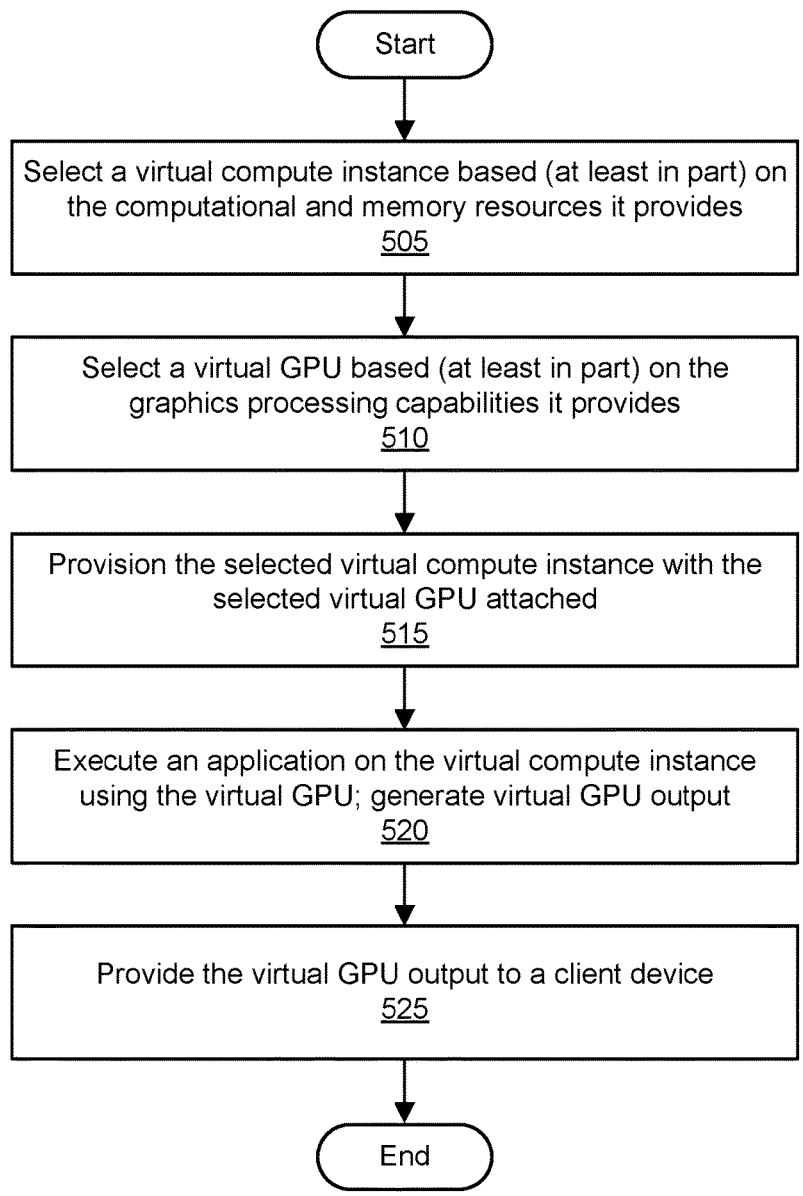
FIG. 5 is a flowchart illustrating a method for virtualizing graphics processing in a provider network, according to one embodiment.

FIG. 5 is a flowchart illustrating a method for virtualizing graphics processing in a provider network, according to one embodiment. As shown in 505, a virtual compute instance may be selected. The virtual compute instance may be selected based (at least in part) on computational and memory resources provided by the virtual compute instance. For example, the virtual compute instance may be selected based (at least in part) on a selection of an instance type by a user. As shown in 510, a virtual GPU may be selected. The virtual GPU may be selected based (at least in part) on graphics processing capabilities provided by the virtual GPU. For example, the virtual GPU may be selected based (at least in part) on a selection of a virtual GPU class by a user. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU.

As shown in 515, the selected virtual compute instance may be provisioned with the selected virtual GPU attached. In one embodiment, the elastic graphics service may interact with one or more other services or functionalities of a provider network, such as a compute virtualization functionality and/or GPU virtualization functionality, to provision the instance with the virtual GPU. The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 520, an application may be executed on the virtual compute instance using the virtual GPU. Execution of the application may include execution of instructions on the virtual compute instance (e.g., on the underlying physical compute instance) and/or virtual GPU (e.g., on the underlying physical GPU). Execution of the application using the virtual GPU may generate virtual GPU output, e.g., output produced by executing instructions or otherwise performing tasks on the virtual GPU. As shown in 525, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

In some embodiments, scaling techniques may be used with the techniques for virtualized graphics processing described herein. A virtual compute instance may be provisioned, and a first set of one or more GPU(s) may be attached to the instance to provide graphics processing. The first set of one or more virtual GPUs may provide a particular level of graphics processing. After a change in GPU requirements for the instance is determined, the second set of one or more virtual GPU(s) may be selected and attached to the virtual compute instance to replace the graphics processing of the first virtual GPU(s) with a different level of graphics processing. The second virtual GPU(s) may be selected based on the change in GPU requirements. Depending upon the change in GPU requirements, such a scaling operation may migrate graphics processing for a virtual compute instance from a less capable or smaller virtual GPU class to a more capable or larger virtual GPU class or from a more capable or larger virtual GPU class to a less capable or smaller virtual GPU class. In one embodiment, the migration of graphics processing may be performed based (at least in part) on user input representing a change in GPU requirements. In one embodiment, the migration of graphics processing may be performed based (at least in part) on detection of an increase in graphics workload. Live migration may be performed while applications are being executed using the first virtual GPU(s) in a manner that does not require changing or relaunching the applications. Migration of the virtual compute instance to a different physical compute instance may also be performed, e.g., to reduce network latency associated with virtualized graphics processing.

In some embodiments, placement optimization techniques may be used with the techniques for virtualized graphics processing described herein. Optimization of resource placement may improve one or more metrics (e.g., related to resource usage or cost) for GPU virtualization. Physical compute instance(s) may be used to implement virtual compute instance(s), and physical GPU(s) may be used to implement virtual GPU(s) attached to the virtual compute instance(s). Using techniques for placement optimization, locations of the virtual compute instance(s) and/or virtual GPU(s) may be selected in the provider network (from among a set of available physical compute instance(s) and/or physical GPU(s)) based on any suitable placement criteria. The one or more placement criteria may be based (at least in part) on metrics associated with maximizing performance, minimizing cost, minimizing energy usage, and/or any other suitable metrics. The placement criteria may also be associated with network locality. For example, to minimize network latency and/or network usage, a virtual compute instance and attached virtual GPU may be placed in the same rack in the same data center such that network communication between the underlying physical compute instance and physical GPU may not extend beyond a top-of-rack switch or other networking component in the rack. If locations within the same rack are not available, then nearby locations within the same data center may be selected for a virtual compute instance and attached virtual GPU. Placement may be optimized in this manner not only for newly provisioned resources but also for migration of a virtual compute instance and/or attached virtual GPU after their use has begun. When scaling is performed for GPU virtualization as discussed above, the locations of any virtual GPUs may be selected based on placement criteria, and/or the location of the virtual compute instance may be moved based on placement criteria.

In some embodiments, application-specific techniques may be used with the techniques for virtualized graphics processing described herein. A virtual compute instance may be provisioned and may be configured to execute an application. The application may be associated with graphics requirements. For example, an application manifest may specify a recommended graphics processing unit (GPU) class and/or size of video memory for the application, or analysis of execution of the application may determine graphics requirements for the application. A virtual GPU may be selected for the virtual compute instance based (at least in part) on the graphics requirements for the application. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. The application may be executed on the virtual compute instance using the virtual GPU. Additional applications on the virtual compute instance may use different application-specific virtual GPUs, and the application-specific virtual GPUs may vary in graphics processing capabilities based on the varying requirements of the applications.

In some embodiments, local-to-remote migration techniques may be used with the techniques for virtualized graphics processing described herein. A virtual compute instance may be provisioned with a local graphics processing unit (GPU) to provide graphics processing. The local GPU may be implemented using attached hardware or using emulation. Because the local GPU may provide only a low level of graphics processing capability, a virtual GPU may be attached to the virtual compute instance to provide improved graphics processing relative to the local GPU. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. Graphics processing for the virtual compute instance may be migrated from the local GPU to the virtual GPU. In one embodiment, graphics processing for a particular application on the virtual compute instance may be migrated from the local GPU to the virtual GPU during execution of the application. In one embodiment, the migration of graphics processing may be performed based (at least in part) on detection of an increase in graphics workload.

Coherent Buffer Mapping

Figure 6:
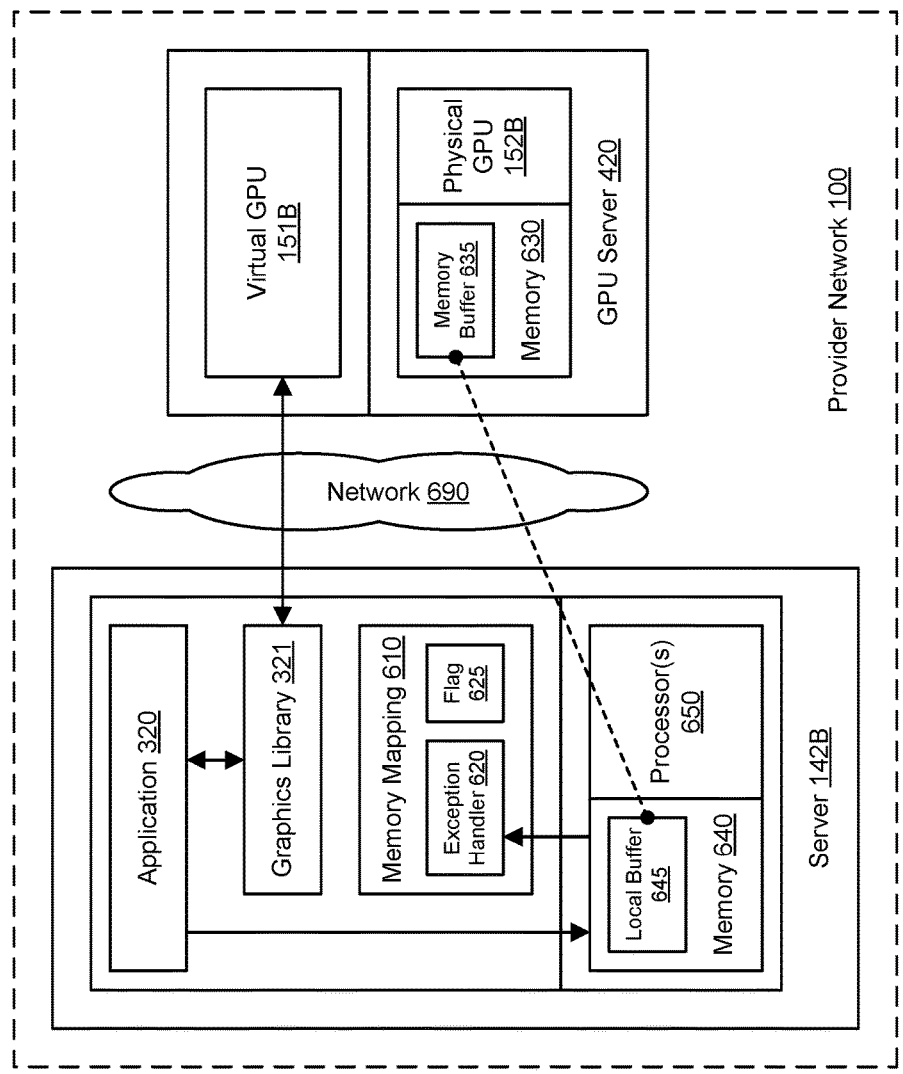
FIG. 6 illustrates an example system environment for coherent buffer mapping for virtualized graphics processing, according to one embodiment.

FIG. 6 illustrates an example system environment for coherent buffer mapping for virtualized graphics processing, according to one embodiment. In some embodiments, a memory buffer 635 in the memory 630 associated with a physical GPU 152B may be coherently mapped to a local buffer 645 in the memory 640 of an application server 142B. A virtual GPU 151B implemented using the physical GPU 152B (e.g., in a GPU server 420) may be attached to the server 142B over a network 690. The network 690 may represent an Ethernet interconnect and/or interconnects implemented with other networking technologies. The network 690 may represent a publicly accessible network (e.g., the Internet), a privately accessible network, or a combination thereof. In one embodiment, both the application server 142B and the GPU server 420 may be provided by a multi-tenant provider network 100, and the network 690 may connect the two servers located in the same rack, in the same data center, or in different data centers. When a GPU is attached via a local bus such as PCI Express or AGP, a buffer may be coherently mapped across the bus using hardware support for memory mapping that is provided by the bus technology. However, the network 690 may lack such built-in or hardware-level support for GPU memory mapping. Accordingly, the server 142B may include a memory mapping component 610 to ensure that the contents of the local buffer 645 on the application server 142B and the contents of the memory buffer 635 on the GPU server 420 are kept consistent at appropriate points in time. The memory mapping 610 may make efficient use of the network 690, e.g., such that contents of a buffer may be transferred across the network only when necessary to maintain buffer coherency. The memory mapping 610 may be implemented in a driver or other component on the server 142B.

As discussed above with respect to FIG. 1 through FIG. 5, a compute instance (such as virtual compute instance 141B) implemented on top of a server 142B may be provisioned with an attached virtual GPU 151B. The server 142B may include one or more processors 650 and a memory 640. The virtual GPU 151B may be included in a GPU server 420 that implements a graphics virtual machine. The GPU server 420 may include a physical GPU 152B and a memory 630. In one embodiment, the memory 630 may represent on-board memory of the physical GPU 152B. After the compute instance on the server 142B is provisioned with the attached virtual GPU 151B, the instance may use the virtual GPU to perform any suitable tasks, e.g., based on input from a client. For example, the compute instance may execute a particular application 320. The application 320 may be selected or provided by the client. The compute instance may also be configured with a particular operating system that provides support for the application 320.

Additionally, the virtual compute instance 141B may be configured with one or more graphics libraries such as library 321. The graphics library 321 may include a set of graphics functions, calls, or commands that can be invoked by other software components on the compute instance, such as one or more processes of the application 320. The graphics library 321 may offer a graphics application programming interface (API), and the graphics library may sometimes be referred to as a graphics API. The term "graphics library" may include any set of functions, calls, or commands that are ultimately executed or implemented using a GPU, even if one or more of the functions, calls, or commands do not involve generating displayable output. In one embodiment, the graphics library 321 may represent one or more versions of Direct3D, such as Direct3D 9, Direct3D 10, Direct3D 11, and so on. In one embodiment, the graphics library 321 may represent a version of OpenGL. In one embodiment, the graphics library 321 may represent a version of Vulkan. In some embodiments, the graphics library 321 may represent one or more general-purpose GPU (GPGPU) computing libraries such as CUDA and/or OpenCL. The virtual GPU 151B may be compatible with the graphics library 321 such that the virtual GPU may respond to commands issued through the graphics library, e.g., to render frames or scenes of graphical data based on commands and input data specified by the graphics library.

The graphics library 321 may represent a runtime API. A runtime API may provide a standard interface to use the virtual GPU 151B without requiring the application 320 to have knowledge of the hardware being used and the underlying command buffer system. A runtime API may keep track of the current state, validate parameters, perform error and consistency checking, manage user-visible resources, and/or validate shader code and shader linkage. On Windows, a graphics acceleration runtime API may be represented by a dynamic library which lies in the user space. For example, OpenGL may expose the opengl32.dll library that also represents the Installable Client Driver (ICD) that sends graphics commands directly to the kernel display driver through the D3DKMT API exposed by GDI32. As another example, Direct3D may be represented by a set of libraries (d3d9.dll, d3d10.dll, d3d11.dll, dxgi.dll) where the draw calls are translated into a series of graphics commands for an intermediate driver that is called the user-mode display driver (UMD).

The native UMD for Direct3D may represent a dynamic library which is distributed by the GPU vendor (e.g., nvd3dum.dll by NVIDIA or atiumd*.dll by AMD). The UMD may run in the same context and address space of the API runtime and may have no elevated privileges. The UMD may implement a lower-level API, the device driver interface (DDI), which is similar to the 3D API but more explicit about synchronization and memory management. The UMD may provide per-process command buffers that are vendor-dependent and may contain the actual commands given to the GPU. The shaders may be compiled in runtime, and the driver may inject custom code to implement specific functionality that does not translate directly to hardware. When the command buffer is validated for the GPU, it may be submitted to a kernel-mode display driver (KMD).

To share the virtual GPU 151B among different processes on the application host, a mechanism may be used to ensure not only that the commands are executed in order but also that the GPU can be used by the processes and that no data corruption is introduced during the scheduling. These operations may be implemented by a device driver executing in kernel mode (KMD), where the scheduler and the main command buffer are used to talk to the GPU. The command processor may read from the stream, decode the commands, and feed a threads/stream scheduler. The kernel driver scheduler may read from each individual per-process command buffer and moves them to direct memory access (DMA) buffers. A GPU may include a DMA controller and a memory management unit (MMU). The DMA buffer may allow the GPU to talk directly to host RAM to fetch and write data without CPU intervention. The MMU may virtualize GPU memory 630 and host memory and offers some memory protection. The DMA buffers may be put into the main command buffer, which may be a ring buffer (first-in, first-out) that is filled by the CPU and read by the GPU until it is drained. If the ring is empty (e.g., if write and read pointers are equal), then the GPU may stall and wait until has something to do. If the CPU fills the entire buffer, it may be required to wait for the GPU to finish and create free space in the buffer.

The host and the graphics controller (command processor) may be connected through the ring buffer (RB). The RB may be initialized with a fixed buffer size, and both write and read pointers may be set to zero (empty buffer). The driver may add packets into the RB and update the write pointer register inside the device. When the device reads packets, it may update the read pointer. Updating both pointers may incur some overhead that can be mitigated by only updating these registers when some block of data has been consumed (e.g., by grouping packets in blocks) instead of doing so for each packet. Some command types called fences may be embedded into the command stream and used by the GPU 152B to make the CPU 650 understand when some commands have been processed. In this way, the CPU 650 can access graphics arrays and update them when the GPU 152B is not bounded.

To implement coherent memory mapping 610 over the network 690, a local buffer 645 on the application host 142B may be allocated and initially protected against write access or read access. The local buffer 645 may be allocated after the application issues a suitable call to the graphics library 321. The local buffer 645 may represent a view of the memory buffer 635 on the GPU server 420. In one embodiment, the call may represent a memory mapping call, using an API of the graphics library 321, that seeks to have a memory buffer 635 of the GPU server 420 mapped to a local buffer 645 on the application server 142B. For example, the call may represent a glMapBufferRange call in OpenGL with the GL_MAP_COHERENT_BIT set. As another example, the call may represent a vkMapMemory call in Vulkan on a heap marked with VK_MEMORY_PROPERTY_HOST_COHERENT_BIT. The call to the graphics library 321 may be intercepted by the memory mapping component 610, and the memory mapping component may apply the access protection against reads or writes. The access protection may be implemented using hardware and/or software components of the server 142B, such as an operating system resident on the server. Whether the local buffer 645 is initially protected against reads or writes may be based (at least in part) on the nature of the memory mapping call and/or any parameters associated with the call. For example, the protection may block write accesses for buffers that allow writes and block read accesses for buffers that allow reads.

In one embodiment, an exception handler or signal handler 620 may be attached to implement aspects of the memory mapping 610. The handler 620 may reside in the process space of the application 320 and may be said to be attached to that application. The handler 620 may intercept an exception, signal, or other suitable form of interaction that is raised or generated if the application 320 attempts to write to the local buffer while it is protected against writes or if the application 320 attempts to read from the local buffer while it is protected against reads. In some embodiments, the handler for writes may differ from the handler for reads. In the case of a write request, the exception handler or signal handler 620 may mark the local buffer 645 as "dirty" (or needing transfer) using metadata such as a dirty flag 625 and allow the write. If marked as such, the contents of the local buffer 645 may be transferred to the memory 630 of the physical GPU 152B via the network when a draw call is received. In the case of a read request, the exception handler or signal handler 620 may lock the application 320 (e.g., using a spinlock), mark the local buffer 645 as needing transfer using the flag 625, and awaken a thread to transfer the contents of the memory buffer 635 to the local memory 640 via the network 690. Using these techniques, a memory buffer 635 of a virtual GPU 151B may be coherently mapped to a local buffer 645 on an application host 142B in a manner that optimizes network usage.

Figure 7A:
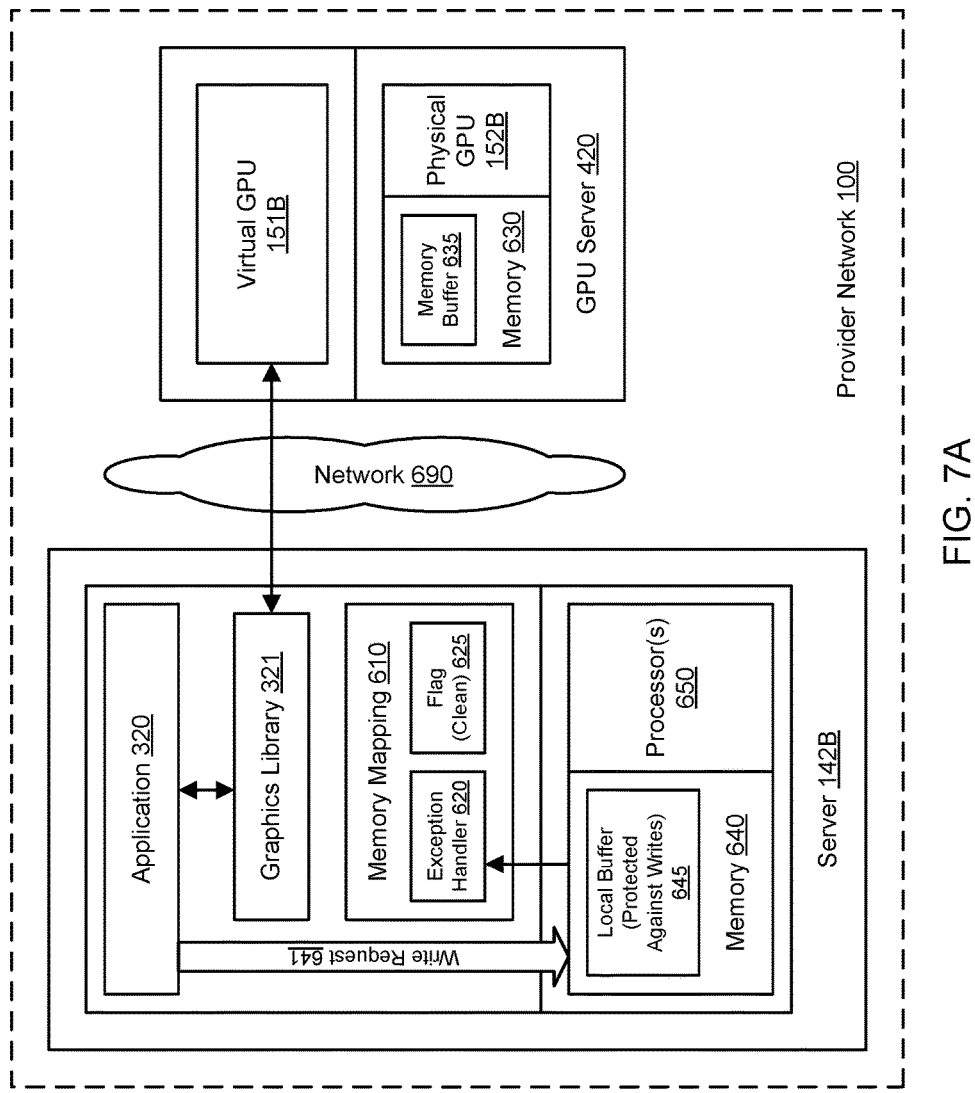
FIG. 7A, FIG. 7B, and FIG. 7C illustrate further aspects of the example system environment for coherent buffer mapping for virtualized graphics processing, including handling of write requests for a mapped buffer, according to one embodiment.
Figure 7B:
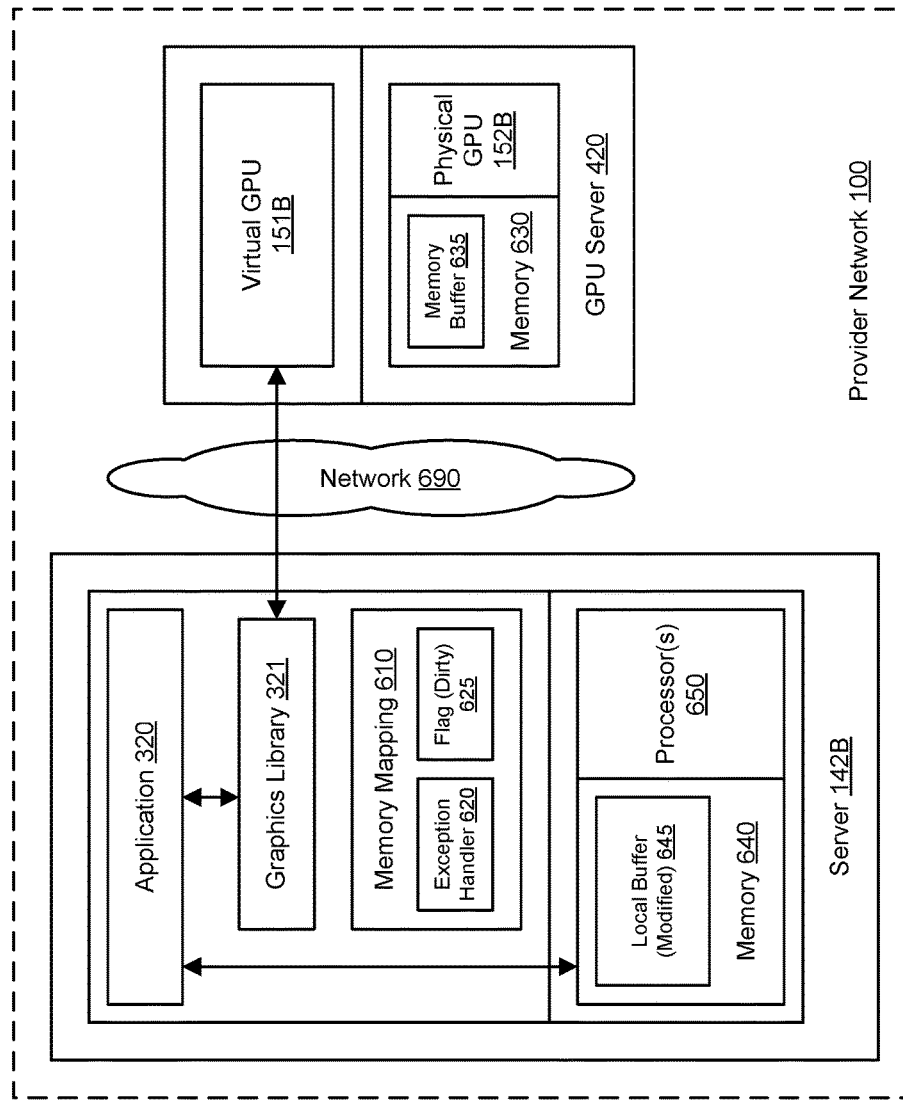
Figure 7C:
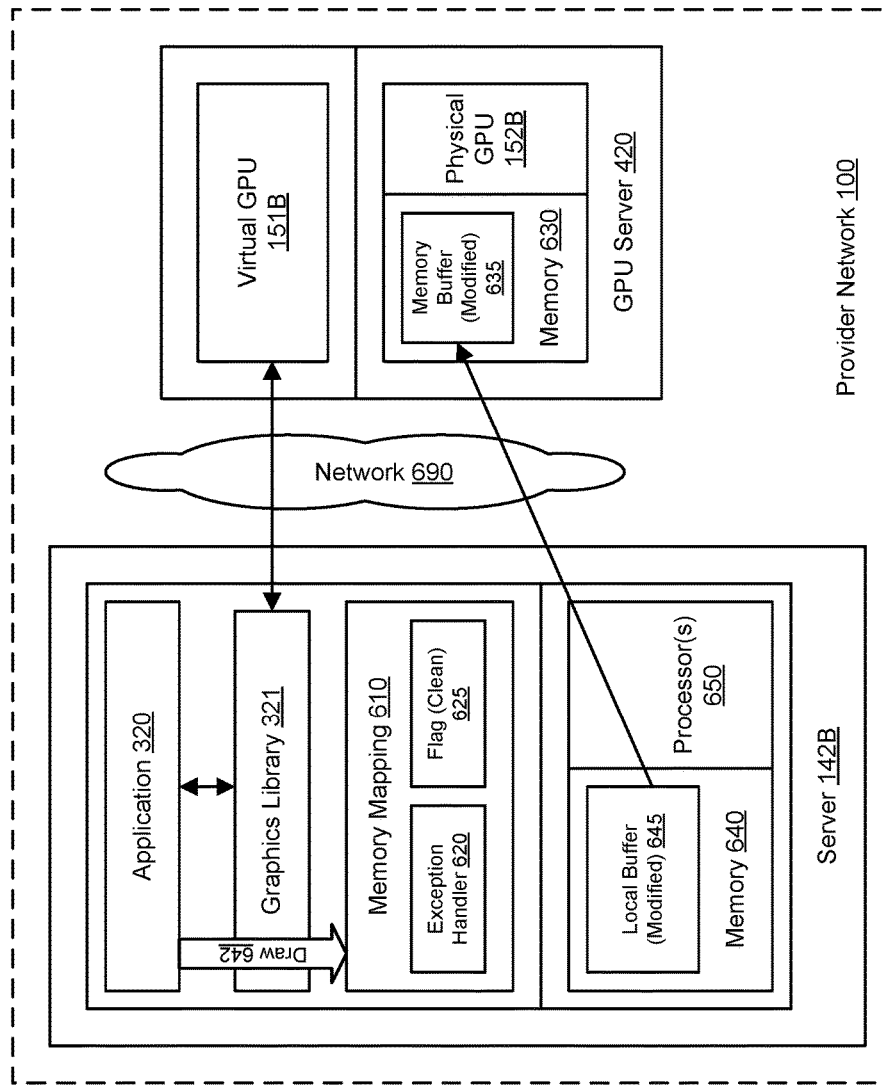

FIG. 7A, FIG. 7B, and FIG. 7C illustrate further aspects of the example system environment for coherent buffer mapping for virtualized graphics processing, including handling of write requests for a mapped buffer, according to one embodiment. To implement coherent memory mapping 610 over the network 690, a local buffer 645 on the application host 142B may be allocated and initially protected against write access. The local buffer 645 may be allocated after the application 320 issues a suitable call to the graphics library 321. The local buffer 645 may represent a view of the memory buffer 635 on the GPU server 420. In one embodiment, the call may represent a memory mapping call, using an API of the graphics library 321, that seeks to have a memory buffer 635 of the GPU server 420 mapped to a local buffer 645 on the application server 142B. The call to the graphics library 321 may be intercepted by the memory mapping component 610, and the memory mapping component may apply the access protection against writes. The access protection may be implemented using hardware and/or software components of the server 142B, such as an operating system resident on the server. The initial protection of the local buffer 645 against writes may be based (at least in part) on the nature of the memory mapping call and/or any parameters associated with the call.

As long as the write-protected buffer 645 has not been modified, a flag (or other metadata) 625 associated with the buffer may indicate that the buffer is currently "clean," not modified, and not needing transfer to the GPU server 420. At some point, the application 320 may issue a write request 641 to attempt to modify the contents of the local buffer 645 while the buffer is protected against writes. An exception may be raised based on such a write request 641, and the exception handler 620 may intercept the exception. As shown in FIG. 7B, the memory mapping component 610 or exception handler 620 may mark the local buffer 645 as "dirty" (or needing transfer) using the dirty flag 625. The memory mapping component 610 or exception handler 620 may also remove the protection against writes and thus allow the write request 641 to modify the contents of the local buffer 645. The application 320 may continue to execute while the local buffer 645 is in this state, and the application may potentially further modify the contents of the local buffer with additional write requests.

As shown in FIG. 7C, at some point, the application 320 may issue a command to the graphics library 321, and the command may require the virtual GPU 151B to have access to the modified local buffer 645 for proper execution. For example, the command may represent a draw call 642 that seeks to have the virtual GPU 151B render one or more graphical elements based (at least in part) on the contents of the memory buffer 635. The memory mapping component 610 may intercept the draw call 642. Upon intercepting the draw call 642, if the flag 625 indicates that the local buffer had been modified, then the memory mapping component 610 may initiate transfer of the contents of the local buffer 635 across the network 690 to the memory buffer 635 on the GPU server 420. In one embodiment, the source of the transfer may be another view of the buffer 645 that has all permissions set (e.g., is readable and writeable). Both the protected view and the unprotected view may represent the same locations in the memory 640. In this manner, the contents of the memory buffer 635 may be made up-to-date, and the draw call may be processed properly by the virtual GPU 151B using the modified memory buffer. Using these techniques, resources associated with the network 690 may be conserved until a transfer of buffer contents from the application server 142B to the GPU server 420 is needed.

Figure 8A:
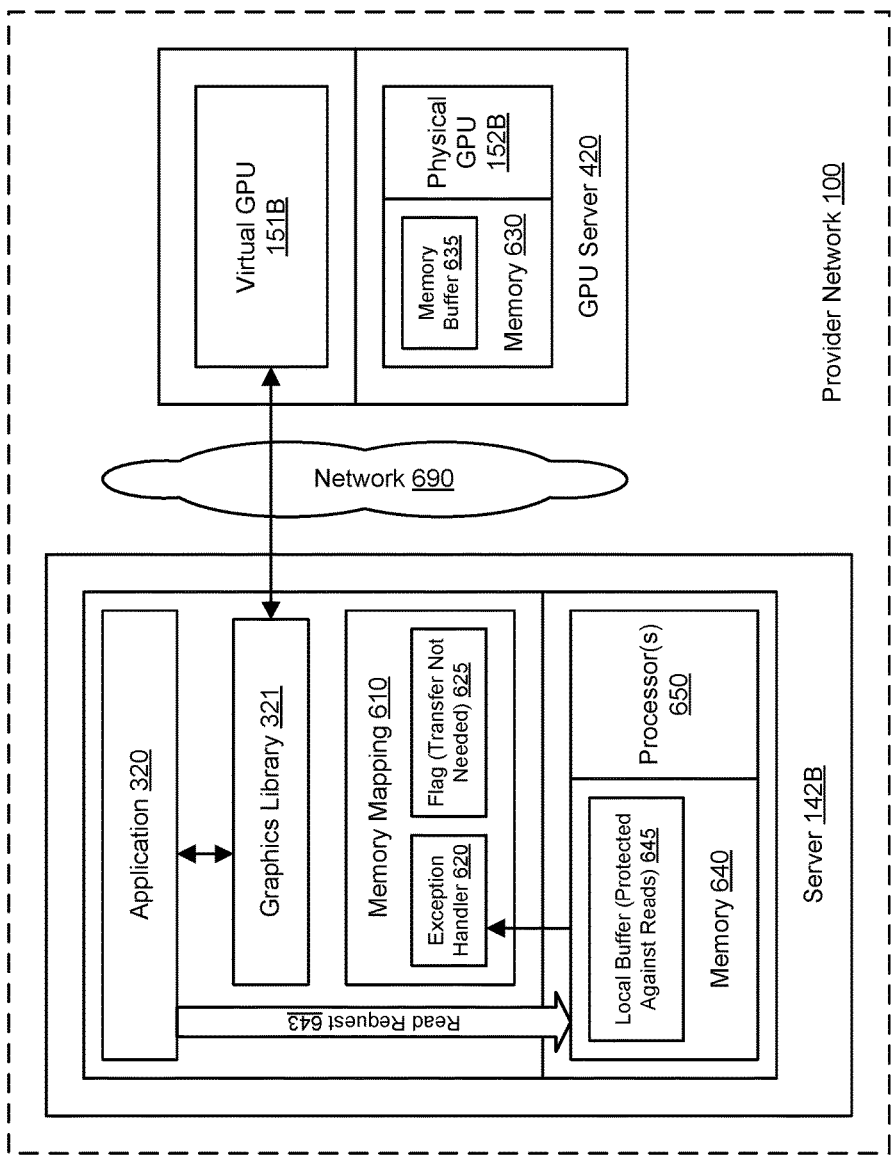
FIG. 8A and FIG. 8B illustrate further aspects of the example system environment for coherent buffer mapping for virtualized graphics processing, including handling of read requests for a mapped buffer, according to one embodiment.
Figure 8B:
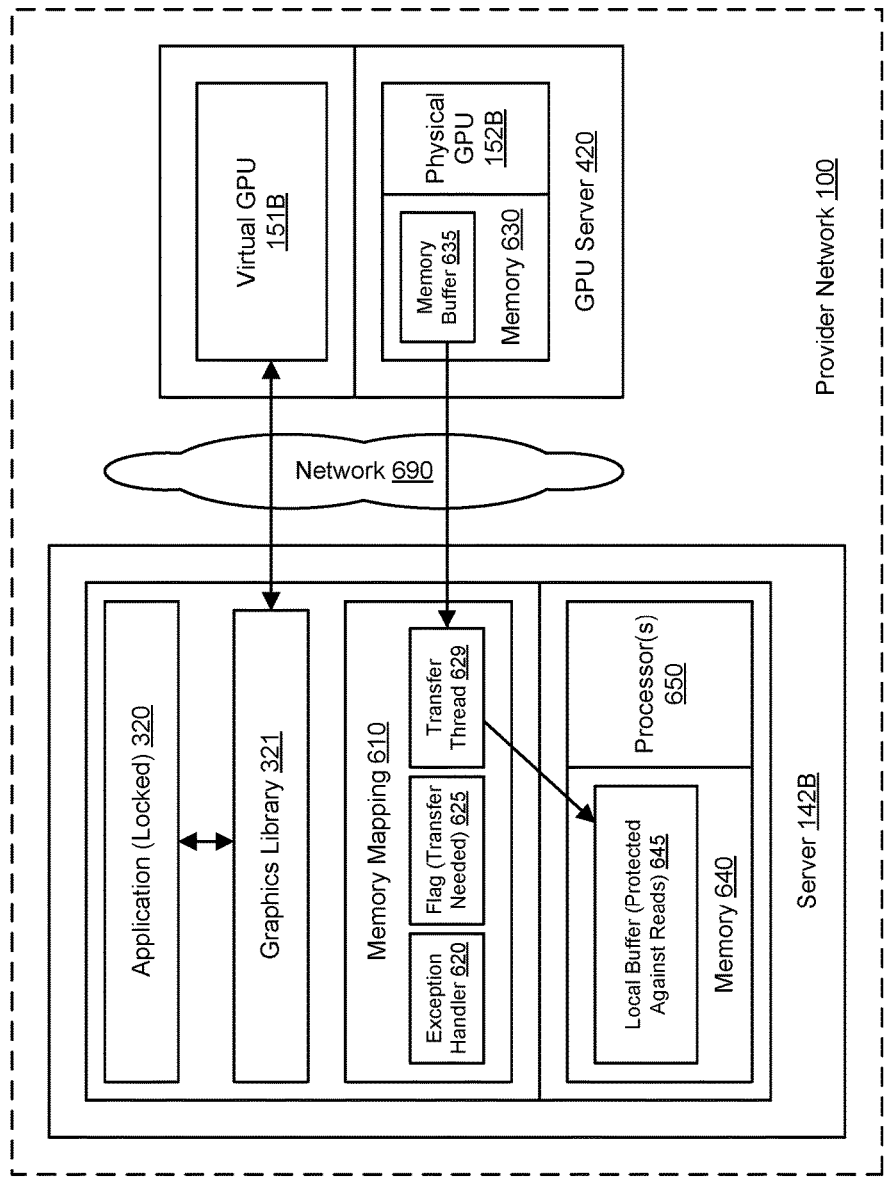

FIG. 8A and FIG. 8B illustrate further aspects of the example system environment for coherent buffer mapping for virtualized graphics processing, including handling of read requests for a mapped buffer, according to one embodiment. To implement coherent memory mapping 610 over the network 690, a local buffer 645 on the application host 142B may be allocated and initially protected against read access. The local buffer 645 may be allocated after the application 320 issues a suitable call to the graphics library 321. The local buffer 645 may represent a view of the memory buffer 635 on the GPU server 420. In one embodiment, the call may represent a memory mapping call, using an API of the graphics library 321, that seeks to have a memory buffer 635 of the GPU server 420 mapped to a local buffer 645 on the application server 142B. The call to the graphics library 321 may be intercepted by the memory mapping component 610, and the memory mapping component may apply the access protection against reads. The access protection may be implemented using hardware and/or software components of the server 142B, such as an operating system resident on the server. The initial protection of the local buffer 645 against reads may be based (at least in part) on the nature of the memory mapping call and/or any parameters associated with the call.

As long as the read-protected buffer 645 has not been read by the application 320, a flag (or other metadata) 625 associated with the buffer may indicate that the buffer is currently unread and not needing transfer from the GPU server 420. At some point, while the local buffer 645 is protected against reads, the application 320 may issue a read request 643 to attempt to acquire at least some of the contents of the local buffer. An exception may be raised based on such a read request 643, and the exception handler 620 may intercept the exception. In one embodiment, the exception handler 620 for read requests may include operations such as driver copy thread mutex.unlock( ) and spinlock.lock( ) to unlock a transfer thread and lock the application, respectively.

As shown in FIG. 8B, the memory mapping component 610 or exception handler 620 may mark the local buffer 645 as needing transfer using the flag 625. The memory mapping component 610 or exception handler 620 may also lock the application 320 until the contents of the memory buffer 635 can be transferred to the memory 640 of the application server 142B. In one embodiment, the lock may be achieved using a user mode spinlock. The memory mapping component 610 or exception handler 620 may awaken or unlock a thread 629 that transfers the contents of the memory buffer 635 to the local memory 640 via the network 690. In one embodiment, the contents of the memory buffer 635 may be copied to another view of the buffer 645 that has all permissions set (e.g., is readable and writeable). Both the protected view and the unprotected view may represent the same locations in the memory 640.

Once the transfer to the buffer 645 is complete, the exception handler 620 may unlock the application 320 and permit the application to read data from the buffer 645 pursuant to the read request 643. The memory mapping component 610 or exception handler 620 may modify the flag 625 to again indicate that transfer is not needed. In one embodiment, the memory mapping component 610 or exception handler 620 may restore the protection against reads after the read request is processed. Using these techniques, resources associated with the network 690 may be conserved until a transfer of buffer contents from the GPU server 420 to the application server 142B is needed.

Figure 9:
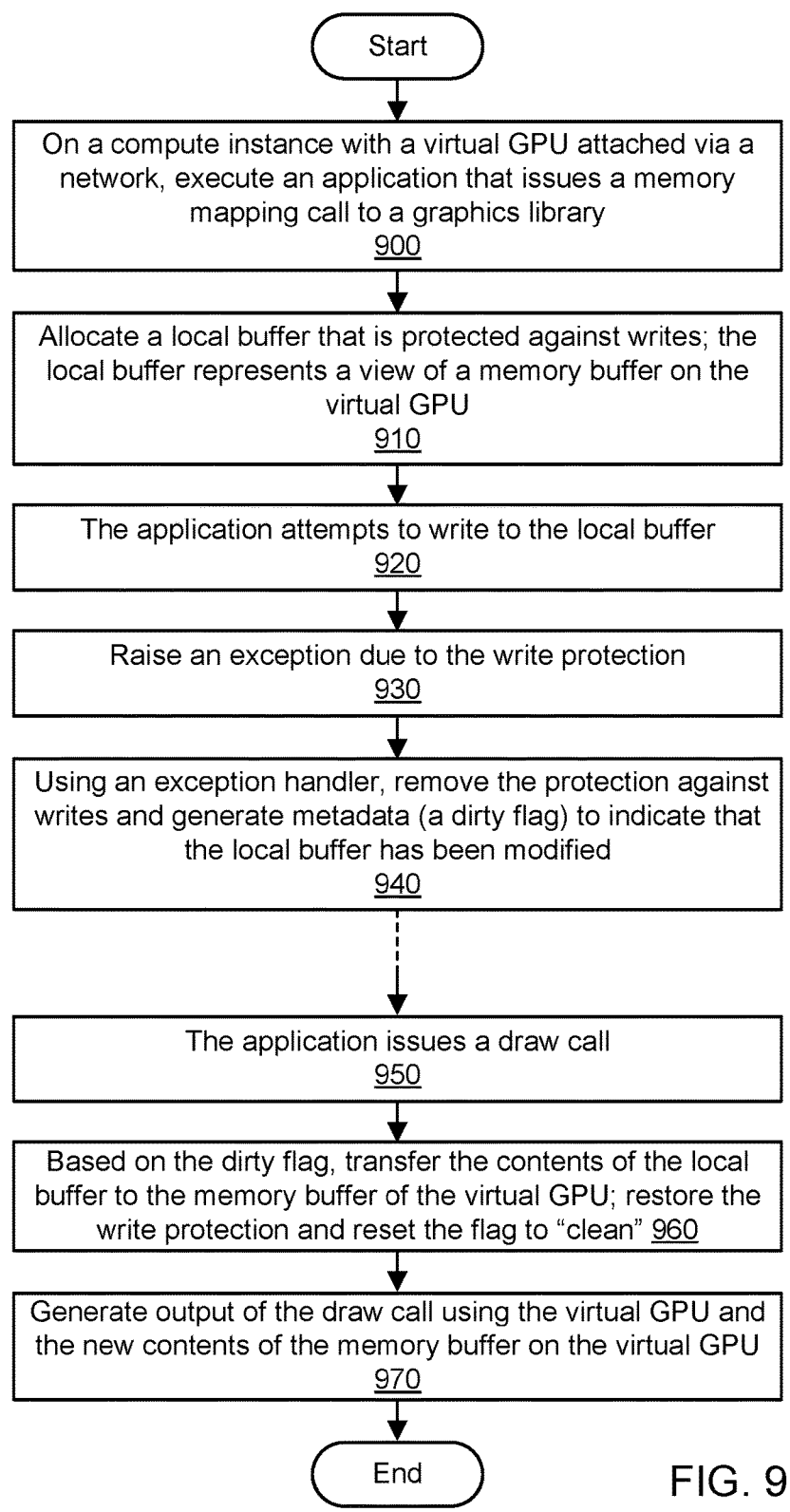
FIG. 9 is a flowchart illustrating a method for coherent buffer mapping for virtualized graphics processing with handling of write requests, according to one embodiment.

FIG. 9 is a flowchart illustrating a method for coherent buffer mapping for virtualized graphics processing with handling of write requests, according to one embodiment. As shown in 900, an application may be executed on a compute instance with an attached virtual GPU. The virtual GPU, as implemented in a GPU server, may communicate with the compute instance via a network. The application may issue a memory mapping call to a graphics library resident on the compute instance. The memory mapping call may seek to have a memory buffer of the GPU server mapped to a local buffer on the compute instance. This call to the graphics library may be intercepted by a memory mapping component on the compute instance.

As shown in 910, a local buffer on the application host may be allocated and initially protected against write access. The local buffer may represent a view of a memory buffer on the GPU server. The local buffer may be allocated and protected against write access using the memory mapping component that intercepted the memory mapping call. The access protection may be implemented using hardware and/or software components of the compute instance, such as an operating system resident on the server. The initial protection of the local buffer against writes may be based (at least in part) on the nature of the memory mapping call and/or any parameters associated with the call. As long as the write-protected buffer has not been modified, a flag (or other metadata) associated with the buffer may indicate that the buffer is currently "clean," not modified, and not needing transfer to the GPU server.

At some point, as shown in 920, the application may issue a write request to attempt to modify the contents of the local buffer while the buffer is protected against writes. As shown in 930, an exception may be raised based on such a write request. An exception handler may intercept the exception. As shown in 940, the exception handler may mark the local buffer as "dirty" (or needing transfer) using the dirty flag. The exception handler may also remove the protection against writes (marking the buffer as writeable) and thus allow the write request to modify the contents of the local buffer. The application may continue to execute while the local buffer is in this state, and the application may potentially further modify the contents of the local buffer with additional write requests.

As shown in 950, at some point, the application may issue a command to the graphics library, and the command may require the virtual GPU to have access to the modified local buffer for proper execution. For example, the command may represent a draw call that seeks to have the virtual GPU render one or more graphical elements based (at least in part) on the contents of the memory buffer. The memory mapping component may intercept the draw call. As shown in 960, upon intercepting the draw call, if the flag indicates that the local buffer had been modified, then the memory mapping component may initiate transfer of the contents of the local buffer across the network to the memory buffer on the GPU server. In one embodiment, the source of the transfer may be another view of the buffer that has all permissions set (e.g., is readable and writeable). In this manner, the contents of the memory buffer may be made up-to-date. Upon initiation of the transfer, the write protection may be restored, and the flag may be reset to "clean" (indicating that the buffer has not been modified since the transfer began). As shown in 970, the draw call may be processed properly by the virtual GPU by generating output based (at least in part) on the modified memory buffer. Using these techniques, resources associated with the network may be conserved until a transfer of buffer contents from the compute instance to the GPU server is needed.

Figure 10:
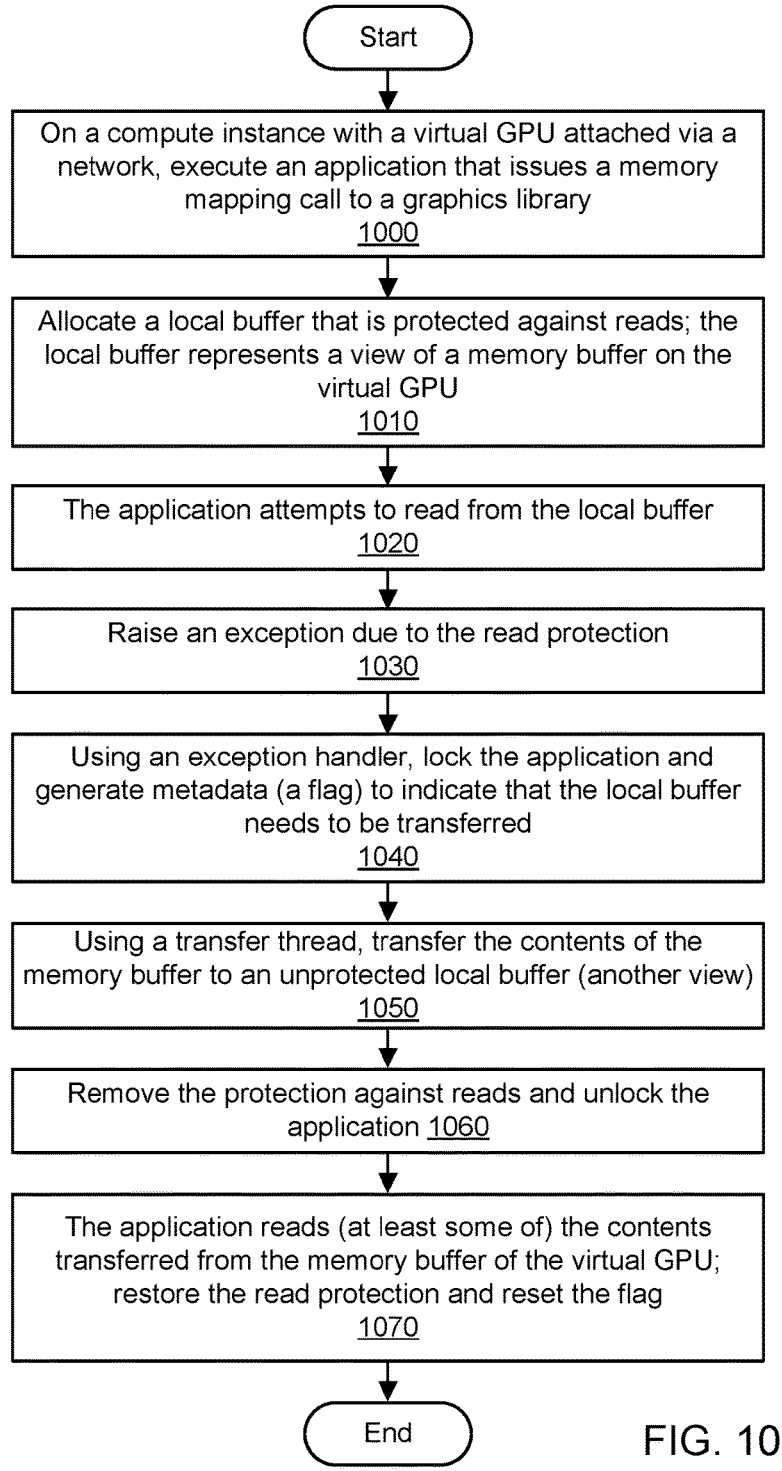
FIG. 10 is a flowchart illustrating a method for coherent buffer mapping for virtualized graphics processing with handling of read requests, according to one embodiment.

FIG. 10 is a flowchart illustrating a method for coherent buffer mapping for virtualized graphics processing with handling of read requests, according to one embodiment. As shown in 1000, an application may be executed on a compute instance with an attached virtual GPU. The virtual GPU, as implemented in a GPU server, may communicate with the compute instance via a network. The application may issue a memory mapping call to a graphics library resident on the compute instance. The memory mapping call may seek to have a memory buffer of the GPU server mapped to a local buffer on the compute instance. This call to the graphics library may be intercepted by a memory mapping component on the compute instance.

As shown in 1010, a local buffer on the application host may be allocated and initially protected against read access. The local buffer may represent a view of a memory buffer on the GPU server. The local buffer may be allocated and protected against read access using the memory mapping component that intercepted the memory mapping call. The access protection may be implemented using hardware and/or software components of the compute instance, such as an operating system resident on the server. The initial protection of the local buffer against reads may be based (at least in part) on the nature of the memory mapping call and/or any parameters associated with the call. As long as the read-protected buffer has not been read by the application, a flag (or other metadata) associated with the buffer may indicate that the buffer is currently unread and not needing transfer from the GPU server.

At some point, as shown in 1020, the application may issue a read request to attempt to acquire at least some of the contents of the local buffer while the buffer is protected against reads. As shown in 1030, an exception may be raised based on such a read request. An exception handler may intercept the exception. As shown in 1040, the exception handler may mark the local buffer as needing transfer using the flag. The exception handler may also lock the application until the contents of the memory buffer can be transferred to the memory of the compute instance. In one embodiment, the lock may be achieved using a spinlock.

As shown in 1050, the memory mapping component or exception handler may awaken a transfer thread that transfers the contents of the memory buffer to the local memory of the compute instance via the network. In one embodiment, the target of the transfer may be another view of the local buffer that has all permissions set (e.g., is readable and writeable). Once the transfer to the local buffer is complete, then as shown as 1060, the memory mapping component or exception handler may remove the protection against reads and unlock the application. As shown in 1070, the application may then read data from the buffer pursuant to the read request. In one embodiment, the memory mapping component may restore the protection against reads after the read request is processed. The memory mapping component or exception handler may also modify the flag to indicate that transfer is not needed. Using these techniques, resources associated with the network may be conserved until a transfer of buffer contents from the GPU server to the application server is needed.

Illustrative Computer System

In at least some embodiments, a computer system that implements a portion or all of one or more of the technologies described herein may include a computer system that includes or is configured to access one or more computer-readable media. FIG. 11 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    a virtual compute instance, wherein the virtual compute instance is implemented using one or more processors and a memory of a server; and
    a virtual graphics processing unit (GPU) attached to the virtual compute instance, wherein the virtual GPU is implemented using a physical GPU of a GPU server, wherein the server and the GPU server are communicatively coupled via a network, and wherein the physical GPU comprises a memory buffer;
    wherein the virtual compute instance is executable to:
        execute an application, wherein the application issues a memory mapping call to a graphics library;
        based at least in part on the memory mapping call, allocate a local buffer in the memory of the server, wherein the local buffer represents a view of the memory buffer of the physical GPU;
        protect the local buffer from access by the application;
        based at least in part on a request by the application to access the local buffer while the local buffer is protected, generate an exception or a signal;
        based at least in part on the exception or the signal, mark the local buffer as needing transfer; and
        based at least in part on the local buffer being marked as needing transfer, transfer contents of the memory buffer from the physical GPU to the local buffer via the network or transfer contents of the local buffer to the memory buffer of the physical GPU via the network.

2. The system as recited in claim 1, wherein the local buffer is protected from write access by the application, wherein the request by the application comprises a write request, and wherein the virtual compute instance is further executable to:
    receive the exception or the signal using a handler, wherein the exception or the signal is generated based at least in part on the write request while the local buffer is protected from write access;
    mark the local buffer as writeable; and
    modify the contents of the local buffer based at least in part on the write request, wherein the metadata is generated using the handler and indicates that the local buffer has been modified.

3. The system as recited in claim 1, wherein the local buffer is protected from read access by the application, wherein the request by the application comprises a read request, and wherein the virtual compute instance is further executable to:
    receive the exception or the signal using a handler, wherein the exception or the signal is generated based at least in part on the read request while the local buffer is protected from read access; and
    lock the application until the contents of the memory buffer of the physical GPU are transferred to the local buffer.

4. A computer-implemented method, comprising:
    based at least in part on a memory mapping call issued by an application on a computing device, allocating a local buffer in a memory of the computing device, wherein a virtual graphics processing unit (GPU) is attached to the computing device, wherein the virtual GPU is implemented using a physical GPU of a GPU server, wherein the computing device and the GPU server are communicatively coupled via a network, and wherein the local buffer represents a view of a memory buffer of the physical GPU;
    protecting the local buffer from access by the application;
    based at least in part on a request by the application to access the local buffer while the local buffer is protected, generating metadata indicating that the local buffer needs transfer; and
    based at least in part on the metadata, transferring contents of the local buffer from the computing device to the physical GPU via the network or transferring contents of the memory buffer from the physical GPU to the computing device via the network.

5. The method as recited in claim 4, wherein the local buffer is protected from write access by the application, wherein the request by the application comprises a write request, and wherein the method further comprises:

receiving a signal, wherein the signal is generated based at least in part on the write request while the local buffer is protected from write access.

6. The method as recited in claim 5, further comprising:
marking the local buffer as writeable; and
modifying the contents of the local buffer based at least in part on the write request, wherein the metadata indicates that the local buffer has been modified.

7. The method as recited in claim 5, further comprising:
issuing a draw call using the application, wherein the contents of the local buffer are transferred to the memory buffer of the physical GPU via the network based at least in part on the draw call and on the metadata, and wherein graphical output is generated by the virtual GPU based at least in part on the draw call and on the contents of the memory buffer.

8. The method as recited in claim 5, further comprising:
based at least in part on transferring the contents of the local buffer to the physical GPU, protecting the local buffer from write access by the application and modifying the metadata to indicate that the local buffer does not need transfer.

9. The method as recited in claim 4, wherein the local buffer is protected from read access by the application, wherein the request by the application comprises a read request, and wherein the method further comprises:
receiving a signal, wherein the signal is generated based at least in part on the read request while the local buffer is protected from read access.

10. The method as recited in claim 9, further comprising:
locking the application until the contents of the memory buffer of the physical GPU are transferred to the local buffer.

11. The method as recited in claim 9, wherein, using a transfer thread executing on the computing device, the contents of the memory buffer of the physical GPU are transferred via the network to an additional view of the memory buffer on the computing device.

12. The method as recited in claim 9, further comprising:
based at least in part on transferring the contents of the memory buffer to the local buffer, modifying the metadata to indicate that the local buffer does not need transfer.

13. The method as recited in claim 4, wherein the virtual GPU is provided by a multi-tenant provider network, wherein the computing device implements a virtual compute instance in the multi-tenant provider network, and wherein the application is executed by the virtual compute instance.

14. A non-transitory computer-readable storage medium storing program instructions computer-executable to perform:
based at least in part on a memory mapping call issued by an application on a computing device, allocating a local buffer in a memory of the computing device, wherein a virtual graphics processing unit (GPU) is attached to the computing device, wherein the virtual GPU is implemented using a physical GPU of a GPU server, wherein the computing device and the GPU server are communicatively coupled via a network, wherein the computing device and the GPU server are provided by a multi-tenant provider network, and wherein the local buffer represents a view of a memory buffer of the physical GPU;
protecting the local buffer from access by the application;
based at least in part on a request by the application to access the local buffer while the local buffer is protected, generating metadata indicating that the local buffer needs transfer; and
based at least in part on the metadata, transferring contents of the local buffer from the computing device to the physical GPU via the network or transferring contents of the memory buffer from the physical GPU to the computing device via the network.

15. The non-transitory computer-readable storage medium as recited in claim 14, wherein the local buffer is protected from write access by the application, wherein the request by the application comprises a write request, and wherein the program instructions are further computer-executable to perform:
receiving an exception using an exception handler, wherein the exception is raised based at least in part on the write request while the local buffer is protected from write access;
using the exception handler, marking the local buffer as writeable; and
modifying the contents of the local buffer based at least in part on the write request, wherein the metadata is generated using the exception handler and indicates that the local buffer has been modified.

16. The non-transitory computer-readable storage medium as recited in claim 15, wherein the contents of the local buffer are transferred to the memory buffer of the physical GPU via the network based at least in part on a draw call and on the metadata, and wherein graphical output is generated by the virtual GPU based at least in part on the draw call and on the contents of the memory buffer.

17. The non-transitory computer-readable storage medium as recited in claim 15, wherein the program instructions are further computer-executable to perform:
based at least in part on transferring the contents of the local buffer to the physical GPU, protecting the local buffer from write access by the application and modifying the metadata to indicate that the local buffer does not need transfer.

18. The non-transitory computer-readable storage medium as recited in claim 14, wherein the local buffer is protected from read access by the application, wherein the request by the application comprises a read request, and wherein the program instructions are further computer-executable to perform:
receiving an exception using an exception handler, wherein the exception is raised based at least in part on the read request while the local buffer is protected from read access; and
using the exception handler, locking the application until the contents of the memory buffer of the physical GPU are transferred to the local buffer.

19. The non-transitory computer-readable storage medium as recited in claim 18, wherein, using a transfer thread executing on the computing device, the contents of the memory buffer of the physical GPU are transferred via the network to an additional view of the memory buffer on the computing device.

20. The non-transitory computer-readable storage medium as recited in claim 18, wherein the program instructions are further computer-executable to perform:
based at least in part on transferring the contents of the memory buffer to the local buffer, modifying the metadata to indicate that the local buffer does not need transfer.

* * * * *